US012626657B2

(12) United States Patent
Sakaguchi

(10) Patent No.: US 12,626,657 B2
(45) Date of Patent: May 12, 2026

(54) DISPLAY DEVICE COMPRISING SIGNAL TRANSMISSION CIRCUITS ARRANGED IN A STAGED MANNER

(71) Applicant: Sony Semiconductor Solutions Corporation, Kanagawa (JP)

(72) Inventor: Takayuki Sakaguchi, Kumamoto (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/841,858

(22) PCT Filed: Feb. 2, 2023

(86) PCT No.: PCT/JP2023/003373
§ 371 (c)(1),
(2) Date: Aug. 27, 2024

(87) PCT Pub. No.: WO2023/181652
PCT Pub. Date: Sep. 28, 2023

(65) Prior Publication Data

US 2025/0174191 A1 May 29, 2025

(30) Foreign Application Priority Data

Mar. 23, 2022 (JP) ................................ 2022-047381

(51) Int. Cl.
*G09G 3/3233* (2016.01)

(52) U.S. Cl.
CPC ... *G09G 3/3233* (2013.01); *G09G 2300/0804* (2013.01); *G09G 2300/0819* (2013.01);
(Continued)

(58) Field of Classification Search
CPC ......... G09G 3/3233; G09G 2300/0804; G09G 2300/0819; G09G 2300/0842;
(Continued)

(56) References Cited

U.S. PATENT DOCUMENTS

2008/0024400 A1* 1/2008 Uchino ................ G09G 3/3233 345/77
2016/0307543 A1* 10/2016 Lim ......................... G09G 3/20
(Continued)

FOREIGN PATENT DOCUMENTS

CN 101123073 A 2/2008
JP 2000250495 A 9/2000
(Continued)

OTHER PUBLICATIONS

Noda, JP 200584128, Espacenet English machine translation of this applicant IDS provided prior art (Year: 2005).*
(Continued)

*Primary Examiner* — Nathan P Brittingham
(74) *Attorney, Agent, or Firm* — Michael Best & Friedrich LLP

(57) ABSTRACT

A display device that limits visibility of a streak is disclosed. In one example, a display device includes a pixel array, signal lines, and a driver. In the pixel array, a pixels with a light emitting element are arranged in a two-dimensional array along a first direction and a second direction. The signal lines extend along the first direction. The driver includes n (n>2) staged signal transmission units that supply signals to the signal lines and that are arranged along the first direction. A first signal transmission unit arranged at an m-th stage (m1<=m<n) is electrically connectable to a first signal line. A second signal line adjacent to the first signal line is electrically connected to the first signal transmission unit or a second signal transmission unit arranged at an (m−1)th stage (m−1>=1) or an (m+1)th stage (m+1<=n).

18 Claims, 16 Drawing Sheets

(52) U.S. Cl.
CPC ............... *G09G 2300/0842* (2013.01); *G09G 2300/0866* (2013.01); *G09G 2310/027* (2013.01); *G09G 2310/0297* (2013.01); *G09G 2310/06* (2013.01); *G09G 2320/0233* (2013.01); *G09G 2320/0242* (2013.01)

(58) Field of Classification Search
CPC ..... G09G 2300/0866; G09G 2310/027; G09G 2310/0297; G09G 2310/06; G09G 2320/0233; G09G 2320/0242
See application file for complete search history.

(56) References Cited

U.S. PATENT DOCUMENTS

| | | | | |
|---|---|---|---|---|
| 2017/0018237 | A1 | 1/2017 | Park | |
| 2020/0294447 | A1* | 9/2020 | Sakaguchi | G09G 3/3233 |
| 2022/0199013 | A1* | 6/2022 | Matsueda | G09G 3/3233 |
| 2023/0402006 | A1* | 12/2023 | Qiu | G09G 3/3233 |
| 2024/0169915 | A1* | 5/2024 | Cao | G09G 3/3258 |

FOREIGN PATENT DOCUMENTS

| | | | | |
|---|---|---|---|---|
| JP | 2004503835 | A | | 2/2004 |
| JP | 2004145347 | A | | 5/2004 |
| JP | 2005084128 | A | * | 3/2005 |
| JP | 2010237358 | A | * | 10/2010 |

OTHER PUBLICATIONS

Kato et al, JP 2010237358 A, Espacenet English machine translation of this applicant IDS provided prior art (Year: 2010).*
International Search Report (PCT/ISA/210), International Application No. PCT/JP2023/003373, dated Apr. 4, 2023.

* cited by examiner

DISPLAY DEVICE COMPRISING SIGNAL TRANSMISSION CIRCUITS ARRANGED IN A STAGED MANNER

TECHNICAL FIELD

The present disclosure relates to a display device.

BACKGROUND ART

In a display device, a method of applying, as a signal for causing pixels to emit light, an image signal by designating a position in a horizontal direction and a position in a vertical direction is widely used. The designation of the position in the horizontal direction and the position in the vertical direction are realized using a driver that designates the position in the horizontal direction and a driver that designates the position in the vertical direction. As an example, a line for transmitting a signal is designated, and a signal corresponding to a pixel value is input for each column in this line, thereby displaying desired images, shadow images, and the like.

The signal lines for transmitting signals are mounted in a semiconductor chip, for example. In this implementation, for example, a plurality of drivers for designation in the horizontal direction may be provided due to a problem of layout and the like. In this case, furthermore, the columns may be individually connected to the drivers arranged at different distances from the pixel array in order of increasing distance. For example, in a case where the drivers are arranged in a four-stage configuration, the first column is connected to the driver at the first stage, the second column is connected to the driver at the second stage, the third column is connected to the driver at the third stage, the fourth column is connected to the driver at the fourth stage, and the fifth and subsequent columns are connected in turn from the first stage.

However, such implementation has a problem where the longer the distance from the signal line to the driver, the more the signal is degraded. When the drivers connected to the respective columns are sequentially arranged, in the above example, a difference arises between a signal transmitted over a long distance to the fourth column and a signal transmitted over a short distance to the fifth column, and there is a problem that a vertical streak appears on the display due to the difference in characteristics, such as the degrees of strength of the signals.

CITATION LIST

Patent Document

Patent Document 1: Japanese Patent Application Laid-Open No. 2010-237358

SUMMARY OF THE INVENTION

Problems to be Solved by the Invention

Therefore, the present disclosure provides a display device that reduces the visibility of a streak in a driver having a laminated structure.

Solutions to Problems

According to an embodiment, a display device includes a pixel array, a plurality of signal lines, and a driver. In the pixel array, a plurality of pixels each having a light emitting element is arranged in a two-dimensional array along a first direction and a second direction that is a direction intersecting the first direction. The plurality of signal lines extends along the first direction. The driver includes a plurality of signal transmission units configured to supply signals to the plurality of signal lines. N pieces (n is any integer satisfying n>2) of the plurality of signal transmission units are arranged in a staged manner along the first direction. A first signal transmission unit arranged at an m-th stage (m is any integer satisfying 1<=m<n) among the plurality of signal transmission units is provided to be electrically connectable to a first signal line among the plurality of signal lines. A second signal line adjacent to the first signal line among the plurality of signal lines is electrically connected to, among the plurality of signal transmission units, the first signal transmission unit or a second signal transmission unit arranged at an (m−1)th stage (m−1>=1) or an (m+1)th stage (m+1<=n).

According to an embodiment, a display device includes a pixel array, a plurality of signal lines, and a driver. In the pixel array, a plurality of pixels each having a light emitting element is arranged in a two-dimensional array along a first direction and a second direction that is a direction intersecting the first direction. The plurality of signal lines extends along the first direction. The driver includes a plurality of signal transmission units configured to supply signals to the plurality of signal lines. N pieces (n is any integer satisfying n>2) of the plurality of signal transmission units are arranged in a staged manner along the first direction. A first signal transmission unit arranged at a first stage among the plurality of signal transmission units is provided to be electrically connectable to a first signal line among the plurality of signal lines. A second signal line adjacent to the first signal line among the plurality of signal lines is electrically connected to, among the plurality of signal transmission units, the first signal transmission unit or a second signal transmission unit arranged at an m-th stage (m is any integer satisfying 1<m<n)

The signal lines may be configured to propagate signals for driving the light emitting elements.

The pixel may include a capacitor a write transistor configured to sample a data voltage supplied to a data line as the signal line and supply the data voltage to the capacitor, and a drive transistor configured to supply a current corresponding to the voltage accumulated in the capacitor to the light emitting element.

The pixel may include a capacitor, a write transistor configured to sample a data voltage supplied to a data line according to a control signal supplied to a first control line as the signal line and supply the data voltage to the capacitor, and a drive transistor configured to supply a current corresponding to the voltage accumulated in the capacitor to the light emitting element.

The pixel may include a capacitor, a write transistor configured to sample a data voltage supplied to a data line and supply the data voltage to the capacitor, a drive transistor configured to supply a current corresponding to the voltage accumulated in the capacitor to the light emitting element, and a first reset transistor configured to supply a predetermined voltage to an anode of the light emitting element according to a control signal supplied to a second control line as the signal line.

The pixel may include a capacitor, a write transistor configured to sample a data voltage supplied to a data line and supply the data voltage to the capacitor, a drive transistor configured to supply a current corresponding to a voltage accumulated in the capacitor to the light emitting element, and a light emission control transistor that is connected in series with the light emitting element and the drive transistor, and is configured to be turned on and off according to a control signal supplied to a third control line as the signal line.

The pixel may include a capacitor, a write transistor configured to sample a data voltage supplied to a data line and supply the data voltage to the capacitor, a drive transistor configured to supply a current corresponding to a voltage accumulated in the capacitor to the light emitting element, and a second reset transistor that is connected between a gate and a drain of the drive transistor, and is configured to be turned on and off according to a control signal supplied to a fourth control line as the signal line.

The plurality of signal lines may be directly electrically connected to one of the plurality of signal transmission units.

The driver may include a selector, and the plurality of signal lines may be provided to be electrically connectable to the plurality of signal transmission units via the selector.

The plurality of signal transmission units may include a first stage, a second stage, . . . , an m-th stage, and an n-th stage in descending order of distance from the pixel array.

A resistance difference between a connection between the first signal transmission unit and the pixel array and a connection between an n-th signal transmission unit and the pixel array may be larger than a resistance difference in a combination of connections between another of the plurality of signal transmission units and the pixel array.

A parasitic capacitance difference between a connection between the first signal transmission unit and the pixel array and a connection between an n-th signal transmission unit and the pixel array may be larger than a parasitic capacitance difference in a combination of connections between another of the plurality of signal transmission units and the pixel array.

The plurality of signal transmission units may include a first stage, a second stage, . . . , an m-th stage, and an n-th stage in descending order of distance from the pixel array.

A resistance difference between a connection between the first signal transmission unit and the pixel array and a connection between an n-th signal transmission unit and the pixel array may be larger than a resistance difference in a combination of connections between another of the plurality of signal transmission units and the pixel array.

A parasitic capacitance difference between a connection between the first signal transmission unit and the pixel array and a connection between an n-th signal transmission unit and the pixel array may be larger than a parasitic capacitance difference in a combination of connections between another of the plurality of signal transmission units and the pixel array.

MODE FOR CARRYING OUT THE INVENTION

Figure 1:
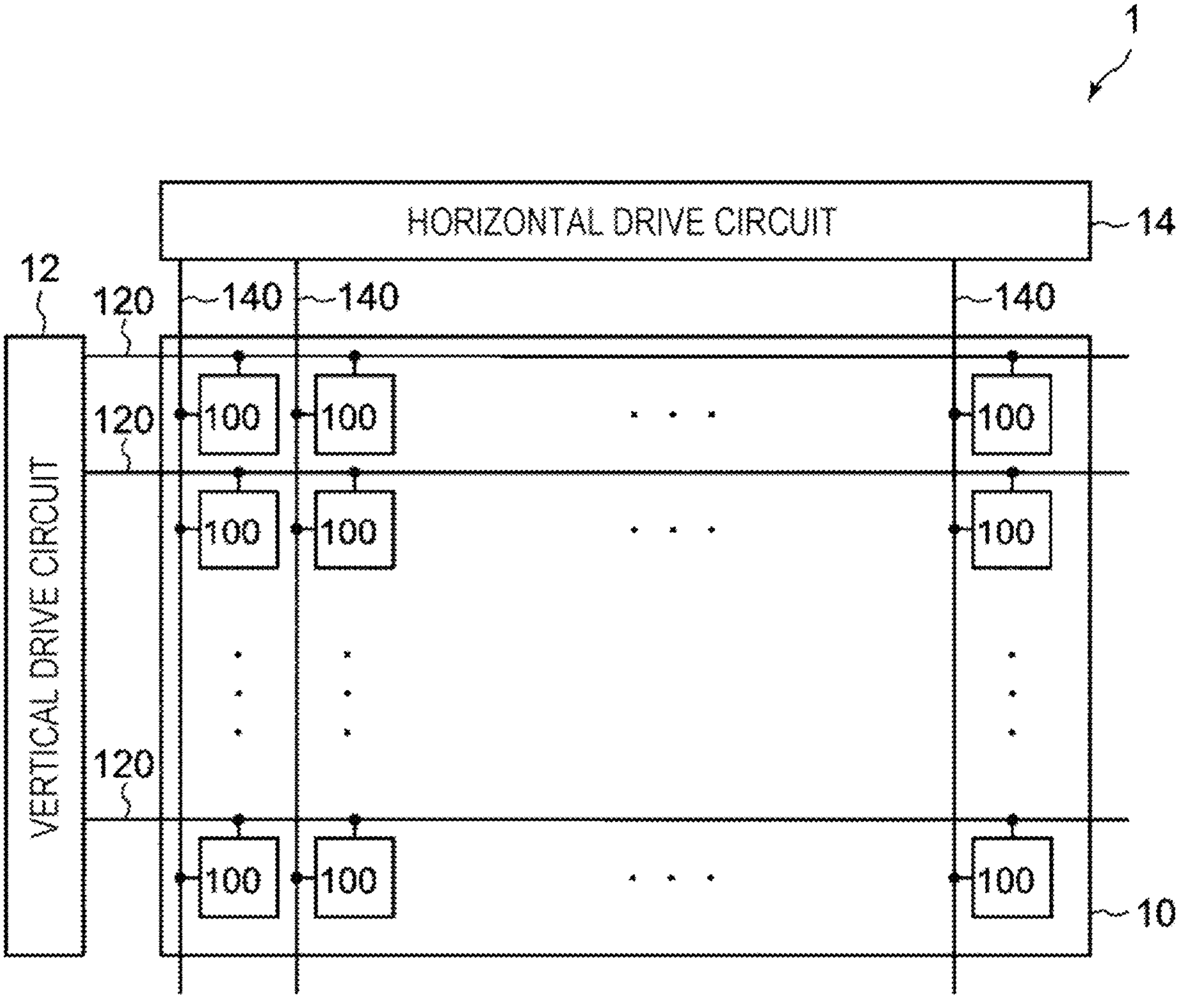
FIG. 1 is a block diagram schematically illustrating a display device according to an embodiment.

The following is a description of embodiments of the present disclosure, with reference to the drawings. The drawings are used for description, and the shape and size of the configuration of each unit in the actual device, the ratio of the size to other configurations, and the like are not necessarily as illustrated in the drawings. Further, since the drawings are illustrated in a simplified manner, it should be understood that components necessary for implementation other than those illustrated in the drawings are provided as appropriate.

FIG. 1 is a diagram schematically illustrating a display device according to an embodiment. The display device 1 is a device that causes light-emitting pixels to emit light on the basis of signals output from a processor and the like and displays images, shadow images, and the like. The display device 1 includes a pixel array 10, a vertical drive circuit 12, and a horizontal drive circuit 14. Furthermore, the display device 1 includes a control circuit (not illustrated) for controlling configurations including the vertical drive circuit 12 and the horizontal drive circuit 14.

The pixel array 10 includes a plurality of pixels 100. In the pixel array 10, the plurality of pixels 100 is arranged in a two-dimensional array along a first direction and a second direction intersecting the first direction. The first direction is, for example, a line direction (horizontal direction of the image), and the second direction is, for example, a column direction (vertical direction of the image), but this relationship may be reversed.

Each pixel 100 includes a light emitting element, such as a light emitting diode (LED), an organic LED (OLED), an electro luminescence (EL) element, or an organic EL (OEL) element, and a pixel circuit that causes the light emitting element to emit light on the basis of a received signal. This pixel emits light of various colors as the light emitting element emits light on the basis of signals applied from the vertical drive circuit 12 and the horizontal drive circuit 14.

Note that the pixel 100 may be configured to each emit one type of color using one color filter, that is, may be configured to form colors by a plurality of pixels 100, or may be configured such that one pixel 100 forms colors by emitting light using a plurality of color filters. In the following description, for example, a mode in which one pixel 100 emits monochromatic light corresponding to R, G, B, or (W) will be described, but other cases can be similarly applied. An example of a case where a pixel includes a plurality of color filters and the like will be described later.

The vertical drive circuit 12 designates the pixels 100 that emit light via a first signal line 120 for each line. That is, the pixels 100 arranged along the horizontal direction in the figure are set as pixels 100 belonging to the respective lines, and a signal for driving light emitting elements is output for each line.

The horizontal drive circuit 14 outputs a signal for driving the pixel 100 in the line designated by the vertical drive circuit 12 for each column via a second signal line 140. That is, with the pixels 100 arranged along the vertical direction in the figure set as pixels 100 belonging to the respective columns, the horizontal drive circuit 14 outputs, for each of these columns, a signal for driving the light emitting elements designated by the vertical drive circuit 12. This signal may be a signal including intensity information for causing each pixel 100 to emit light.

In the present embodiment, a case where the vertical drive circuit 12 and the horizontal drive circuit 14 have a laminated structure is described.

Figure 2:
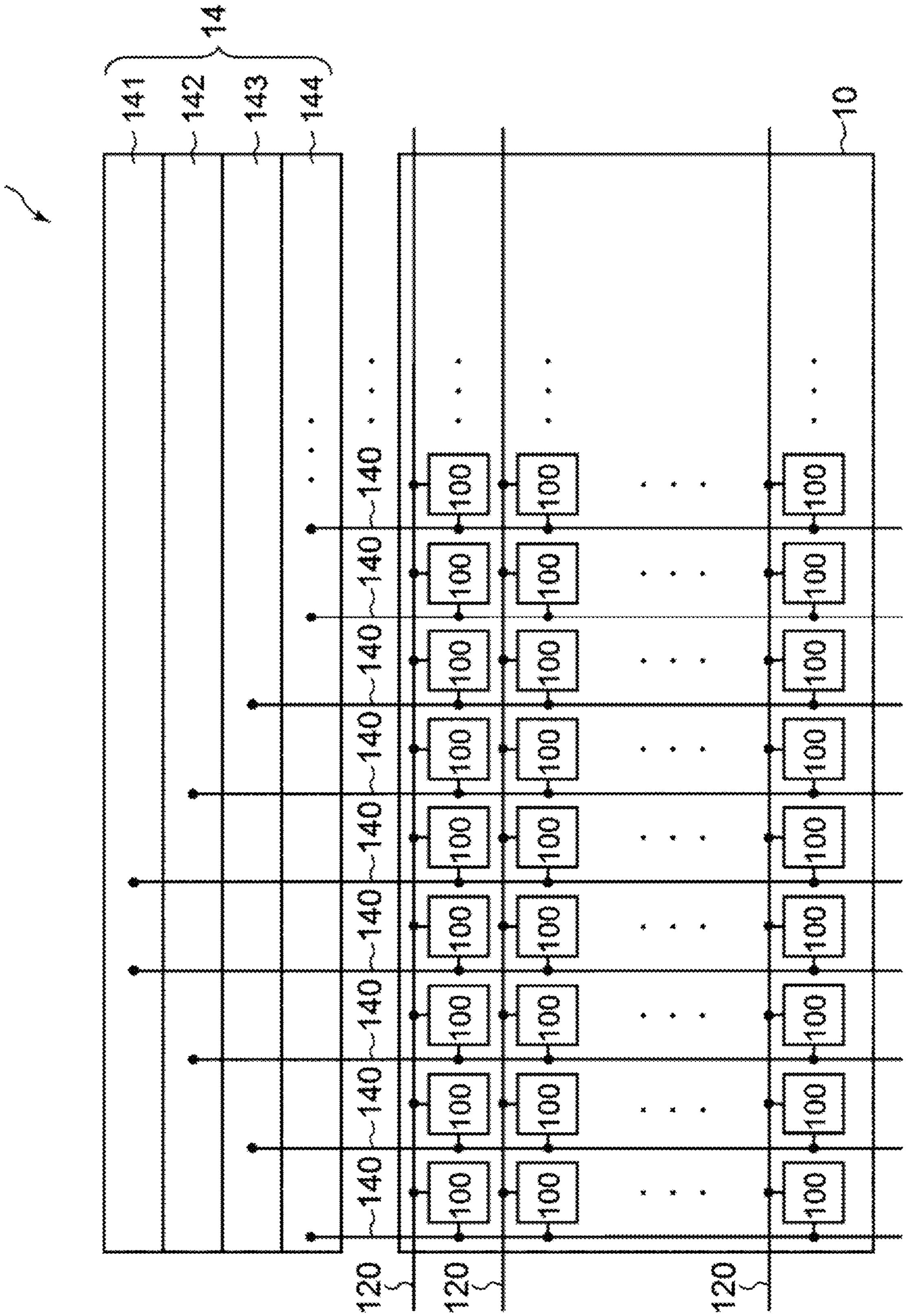
FIG. 2 is a diagram illustrating a connection relationship between horizontal drive circuits and pixels according to an embodiment.

FIG. 2 is a diagram schematically illustrating an example of the arrangement and connection of the pixels 100 and the horizontal drive circuit 14. It should be noted that, as a non-limiting example, the positional relationship in this figure is schematically illustrated for illustrative purposes rather than being of an exact size and arrangement.

The horizontal drive circuit 14 may be arranged in three or more stages at different distances from the pixel array 10. As illustrated in FIG. 2, the display device 1 includes, for example, horizontal drive circuits 141, 142, 143, and 144 arranged at different distances from the pixel array 10. As a non-limiting example, each horizontal drive circuit 14 is formed in the same semiconductor layer in a case where the display device 1 is configured by a laminated semiconductor layer. Each of these horizontal drive circuits 14 includes a selector, a demultiplexer, and the like, and outputs a signal for driving the light emitting elements for each column or determining the light emission intensity of the light emitting elements.

The horizontal drive circuit 141 arranged at the first stage is connected to the pixels 100 belonging to the first column, the eighth column, the ninth column, . . . in the pixel array 10 via second signal lines 140, for example. The horizontal drive circuit 142 arranged at the second stage is connected to the pixels 100 belonging to the second column, the seventh column, the tenth column, . . . in the pixel array 10 via second signal lines 140, for example. The horizontal drive circuit 143 arranged at the third stage is connected to the pixels 100 belonging to the third column, the sixth column, the 11th column, . . . in the pixel array 10 via second signal lines 140, for example. The horizontal drive circuit 144 arranged at the fourth stage is connected to the pixels 100 belonging to the fourth column, the fifth column, the 12th column, . . . in the pixel array 10 via second signal lines 140, for example.

By arranging the horizontal drive circuits 14 for the respective columns in this manner, it is possible to solve a layout problem and limit power consumption. The horizontal drive circuits 14 of the multiple stages are connected to the respective columns as described above. In a case where the horizontal drive circuit 14 is arranged as illustrated in FIG. 2, in the paths connecting pixels 100 with the horizontal drive circuit 141 at the first stage and the horizontal drive circuit 144 at the fourth stage, there is a possibility that the qualities of the signals have a difference larger than the quality difference between other horizontal drive circuits due to the problems of the path lengths and the parasitic capacitance in the middle of the paths.

More specifically, there are a change in a time constant depending on a difference in the magnitude of the resistance depending on the path length or a difference in the parasitic capacitance, a crosstalk difference of the signal lines, and a variation in characteristics of the amplifier in the previous stage of outputting the signals. Due to these characteristics, a difference occurs in the drive voltages or the write voltages.

If the horizontal drive circuits 14 having significantly different signal qualities are connected to adjacent columns, there is a possibility that a person viewing the display perceives a vertical streak in the adjacent columns. For this reason, in the present embodiment, the second signal lines 140 are connected such that horizontal drive circuits having a large difference in the stage number, that is, having a large difference in the distance from the pixel array 10 are not connected to adjacent columns.

In FIG. 2, the horizontal drive circuits 14 are illustrated, but the present disclosure is not limited thereto, and similar processing can be performed even in a mode in which a plurality of vertical drive circuits 12 is arranged at different distances from the pixel array 10. That is, by appropriately connecting the signal lines that transmit signals to the light emitting elements arranged successively in the first direction and the stacked drive circuits, signals having a large difference in signal transmission characteristics are prevented from being applied to adjacent pixels in the second direction.

As described above, the first direction may be a column, the second direction may be a line, and the pixels 100 belonging to a column may be connected to any of the plurality of horizontal drive circuits 14 (horizontal drivers). As another example, the first direction may be a line, the second direction may be a column, and the pixels 100 belonging to a line may be connected to any of the plurality of vertical drive circuits 12 (vertical drivers).

Describing using the connection example of FIG. 2, the driver (for example, the horizontal drive circuit 14) includes a plurality of signal transmission circuits (signal transmission units) that transmits signals to the respective pixels 100. A plurality of signal transmission circuits may be provided in the driver, and in this case, the signal transmission circuits may be provided for each column or each line. For example, the horizontal drive circuit 14 includes a plurality of signal transmission circuits (for example, horizontal drive circuits 141, 142, 143, 144) connected to the plurality of second signal lines 140.

For example, the signal transmission circuits are arranged so as to have different distances from the pixel array 10. Furthermore, the respective signal transmission circuits may have different characteristics such as a resistance value in connection with the pixel array 10, parasitic capacitance, and the like.

The signal transmission circuits may be formed to be connected to all the second signal lines 140 from each horizontal drive circuit 14, or may be formed to be connected to necessary signal lines to transmit signals in a case where the signal lines to be connected are fixed according to the combination of the above example.

For example, for each signal transmission circuit, the signal lines to which the signal transmission circuit is connected may be defined when the semiconductor is formed. In this case, a signal line to be connected to a signal transmission circuit is directly connected to any one of the plurality of signal transmission circuits.

For example, the signal lines connected to the respective signal transmission circuits may be connected to the plurality of signal transmission circuits via a selector, a demultiplexer (not illustrated), and the like. In this case, a control circuit (not illustrated) that transmits a signal may be separately provided so as to form an appropriate connection combination for the selector and the like, or a mode in which the signal transmission circuits and the signal lines are appropriately connected by control by the control circuit may be adopted.

Furthermore, the multiple circuits that perform the same operation and have different distances in the connection with the pixel array 10 may be circuits that distribute the light emission intensity of the light emitting element to each pixel 100 instead of the drivers.

The combination having a large difference in the signal transmission characteristics may be, for example, a combination of the pixels 100 connected to the driver at the first stage and the driver at the n-th stage in a case where the plurality of drivers is arranged in n stages.

In FIG. 2, for example, the pixels 100 belonging to the leftmost column are connected to the horizontal drive circuit 141 at the first stage. Then, the pixels 100 belonging to each column are connected in turn to the horizontal drive circuit 142 at the second stage, the horizontal drive circuit 143 at the third stage, and the horizontal drive circuit 144 at the fourth stage. Then, the column next to the column connected to the horizontal drive circuit 144 at the fourth stage is also connected to the horizontal drive circuit 144 at the fourth stage. Subsequently, the circuit (driver) to be connected is changed in order of the horizontal drive circuit 143 at the third stage, the horizontal drive circuit 142 at the second stage, the horizontal drive circuit 141 at the first stage, and the horizontal drive circuit 141 at the first stage.

Figure 3:
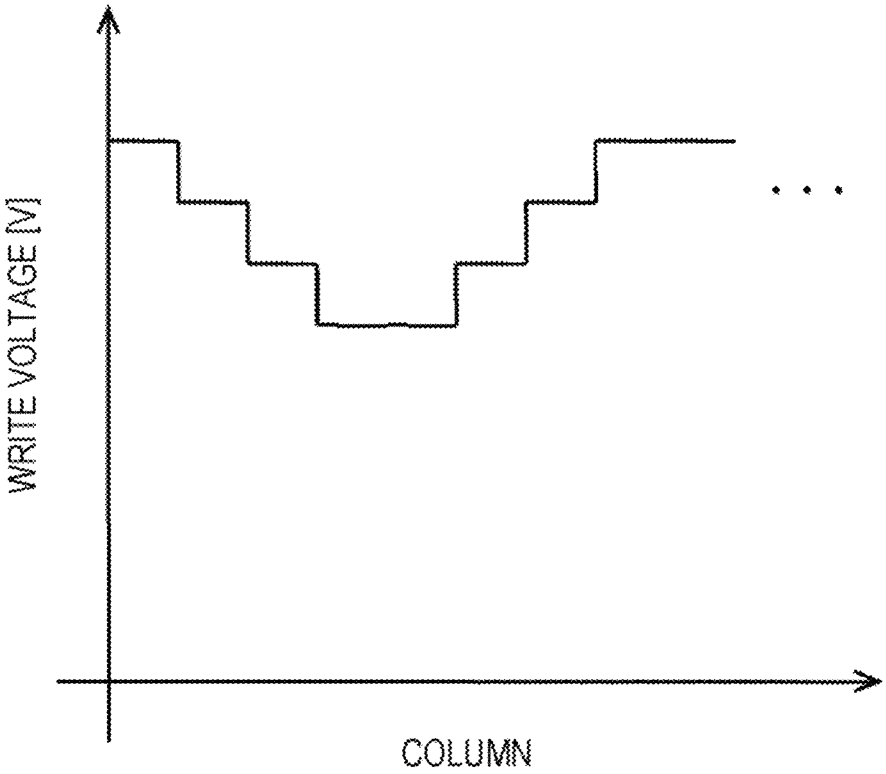
FIG. 3 is a diagram illustrating voltages applied to pixels of respective columns according to an embodiment.

FIG. 3 is a diagram illustrating voltages applied to the horizontal drive circuits and pixels of the respective columns connected in this manner. As shown in this figure, even if the voltages are different depending according to the stage, the horizontal drive circuits 14 at the first stage and the fourth stage (n-th stage) are not applied to the pixels 100 belonging to the adjacent columns, so that the voltages can be distributed without increasing the difference in signal quality.

In summary, in a case where a certain signal line is connected to the signal transmission circuit at the m-th stage ($1<=m<=n$), the adjacent signal line may be connected to the signal transmission circuit at the m-th stage, may be connected to the signal transmission circuit at the $(m-1)$th stage in a case where $m-1>=1$, or may be connected to the signal transmission circuit at the $(m+1)$th stage in a case where $m+1<=n$.

As another non-limiting example, in a case where a certain signal line is connected to the signal transmission circuit at the first stage, the adjacent signal line may be connected to a signal transmission circuit other than the signal transmission circuit at the n-th stage. In the drawings of the present disclosure, the signal transmission circuits of the first to n-th stages are arranged in order, but the present disclosure is not limited thereto. For example, the combination of the signal transmission circuits having a large difference in the characteristics of the voltages applied to the pixels 100 may be set as the first stage and the n-th stage, and in the combinations of the signal transmission circuits other than the first stage and the n-th stage, the combination of the signal transmission circuits having the second largest difference in the characteristics of the voltages applied to the pixels 100 may be set as the second stage and the n-lth stage. In this case, a signal transmission circuit having a smaller difference in the characteristic of the voltage applied to the pixel 100 from the first stage may be used as the signal transmission circuit of the second stage.

In the following description of the embodiment, the first stage, the second stage, . . . are also referred to according to the distance from the pixel array 10, but as described above, the assignment of this number is illustrated as a non-limiting example.

Figure 4:
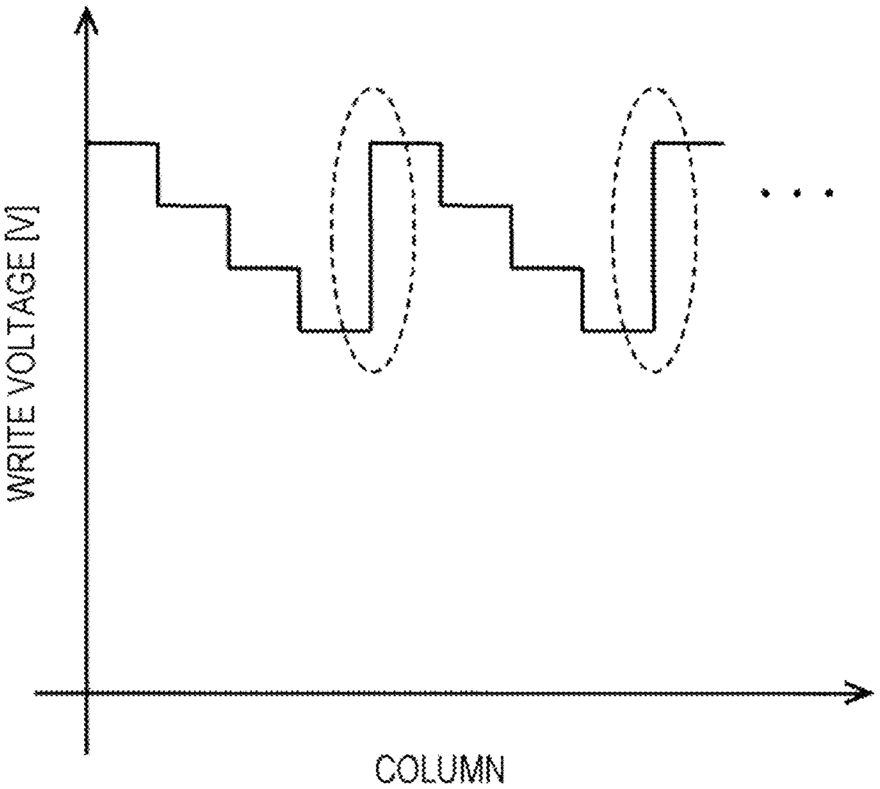
FIG. 4 is a diagram illustrating voltages applied to pixels of respective columns according to a comparative example.

FIG. 4 is a diagram illustrating voltages applied to the pixels for each column connected to the horizontal drive circuits according to the comparative example. In this comparative example, for example, each column is connected to the horizontal drive circuit 14 at the first stage, the second stage, the third stage, the fourth stage, the first stage, . . . . In a case where the connection is made in this manner, voltages having significantly different characteristics are applied at the portions indicated by the dotted lines, that is, between the fourth stage and the first stage.

In contrast, as illustrated in FIG. 3, according to the present embodiment, it is possible to apply a voltage to each column in a mode in which characteristics such as a voltage value do not greatly change.

Note that the case where the number n of stages is four has been described, but the present invention is not limited thereto. For example, the number of stages n may be three or five or more. Furthermore, the number of stages n may be two, and in this case, by connecting in the order of the first stage, the first stage, the second stage, the second stage, and the first stage, it is possible to limit a change in the characteristic value as compared with the case where the drivers at the first stage and the second stage are alternately connected.

Furthermore, in the above description, the connection destinations are changed in order, but this order is not limited to the above order. For example, in a case where a large visual recognition difference is not recognized in the pixels 100 connected to the drivers at the first stage and the third stage, the first stage, the third stage, the second stage, the fourth stage, the fourth stage, the second stage, . . . may be connected in this order. In addition, in a case where the characteristics are greatly different between the third stage and the fourth stage, and the characteristics are not changed in the other stages, it is sufficient that the drivers at the third stage and the fourth stage are not connected to adjacent columns.

In a case where the horizontal drive circuits 14 operate as a driver, the driver may be a ramp type or a voltage follower type.

As described above, according to the present embodiment, it is possible to limit the occurrence and visibility of streaky unevenness in the image caused by the arrangement of the driver.

Next, a case where the pixel 100 includes RGB subpixels will be described. In this case, the driver outputs a drive signal and a signal indicating a pixel value for each of RGB for each pixel 100.

Figure 5:
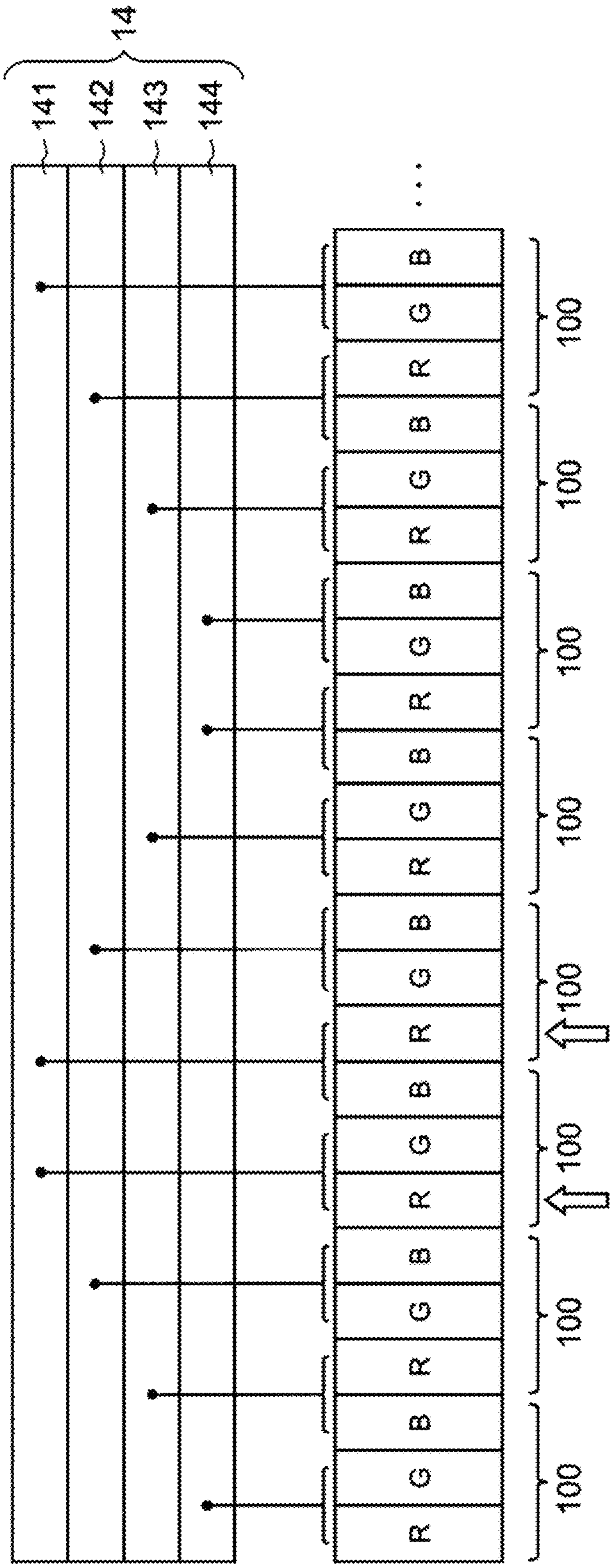
FIG. 5 is a diagram illustrating a connection relationship between horizontal drive circuits and pixels according to an embodiment.

FIG. 5 is a diagram illustrating a connection relationship between such pixels 100 and a plurality of drivers arranged at different distances from the pixel array 10. As an example of the drivers, the horizontal drive circuits 14 are used in a similar manner as described above, but the drivers are not limited thereto.

As illustrated in this figure, even in a case where each of the pixels 100 has a light emitting region for each color, it is possible to limit the application of signals having significantly different characteristic values by connecting in a similar manner. For example, the pixels 100 and the horizontal drive circuits 14 may be connected for every two colors. That is, the connection may be such that the horizontal drive circuit 141 is connected to R and G of the leftmost pixel 100, the horizontal drive circuit 142 is connected to B of the leftmost pixel 100 and R of the next pixel 100, and so on.

Even in the case of such connections, similarly to the above-described embodiment, it is possible to limit the visibility of a vertical streak by preventing the combination of the first stage and the n-th stage or the combination having a larger characteristic value than the others from being applied to adjacent columns.

In a case where the fourth stage and the first stage are applied to successive columns in the order of the first row to the fourth row and the first row to the fourth row in a similar manner as in the example of FIG. 4, a difference in characteristics appears between adjacent Rs indicated by arrows as an example, and vertical streaks caused by red appear for every predetermined pixels, for example, for every eight pixels. Of course, it appears in a similar manner for other colors.

In contrast, it is possible to limit the visibility of vertical streaks by changing the connection relationship in a similar manner as in the above embodiment.

Although the description of the pixel 100 is omitted in the above description, the embodiment of the present disclosure can be applied to the configuration of the pixel 100 as described below, for example.

Figure 6:
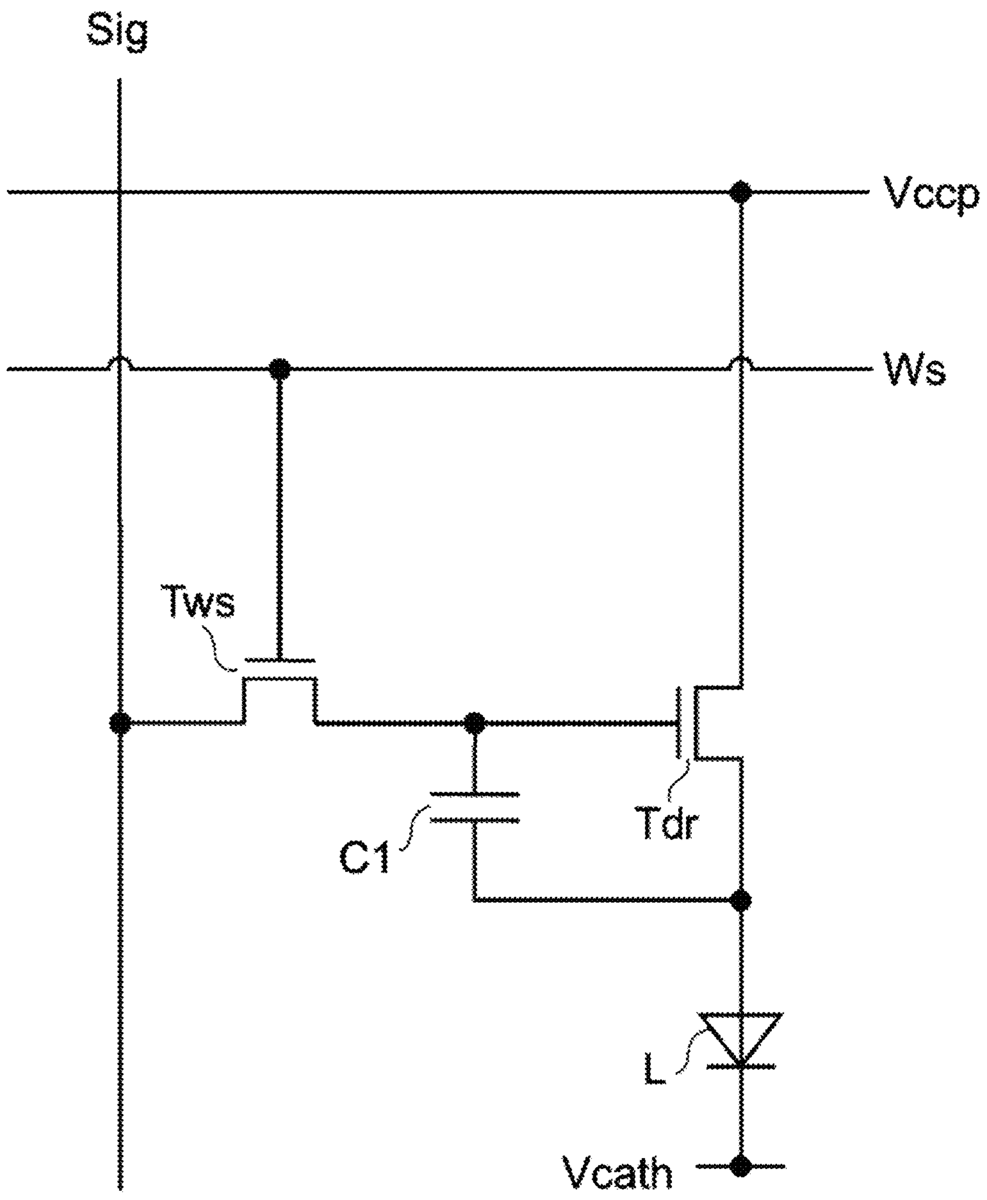
FIG. 6 is a diagram illustrating an example of a pixel according to an embodiment.

FIG. 6 is a diagram illustrating an example of a pixel circuit that outputs a signal to the light emitting element L. FIG. 6 illustrates a pixel circuit having a very simple configuration. The pixel 100 includes transistors Tws and Tdr, a capacitor C1, and a light emitting element L.

For example, the light emitting element L emits light when a current flows from the anode to the cathode. The cathode is connected to a reference voltage Vcath (for example, the ground voltage). The anode of the light emitting element L is connected to the source of the transistor Tdr and one terminal of the capacitor C1.

The transistor Tws is an n-type MOSFET, for example, and is a transistor (a write transistor) that controls writing of a pixel value. In the transistor Tws, a data voltage indicating a pixel value is input to a drain from the signal line Sig, a source is connected to the other end of the capacitor C1 and a gate of the transistor Tdr, and a control signal for write control is applied to a gate from the signal line Ws. The transistor Tws writes the data voltage supplied from the signal line Sig to the capacitor C1 according to the control signal from the signal line Ws. When the transistor Tws is turned on, the data voltage supplied from the signal line Sig is charged (written) in the capacitor C1, and the emission intensity of the light emitting element L is controlled by the charge amount of the capacitor C1.

The transistor Tdr is an n-type MOSFET, for example, and is a transistor (drive transistor) that controls driving of the light emitting element L by causing a current based on the potential written in the capacitor C1 to flow. The transistor Tdr has a drain connected to the power supply voltage Vccp for driving the MOSFET, a gate connected to the source of the transistor Tws, and a source connected to the anode of the light emitting element L. Also, the capacitor C1 is arranged between the gate and the source of the transistor Tdr.

As a simple example, the pixel 100 performs writing to the capacitor C1 sampled on the basis of the data signal input from the signal line Sig for determining the light emission intensity for each pixel in this manner, and causes the drain current corresponding to the intensity of the written signal to flow to the light emitting element L, thereby emitting light with an appropriate intensity based on the data signal input from the signal line Sig.

In the configuration of the pixel 100, at least one of the circuits that apply a voltage of the signal line Ws or the signal line Sig may be configured to include signal transmission circuits provided in a staged manner at different distances from the pixel array 10 as described above. In this case, it is possible to limit the visibility of vertical streaks or horizontal streaks by connecting the columns by the connection method as described above.

Figure 7:
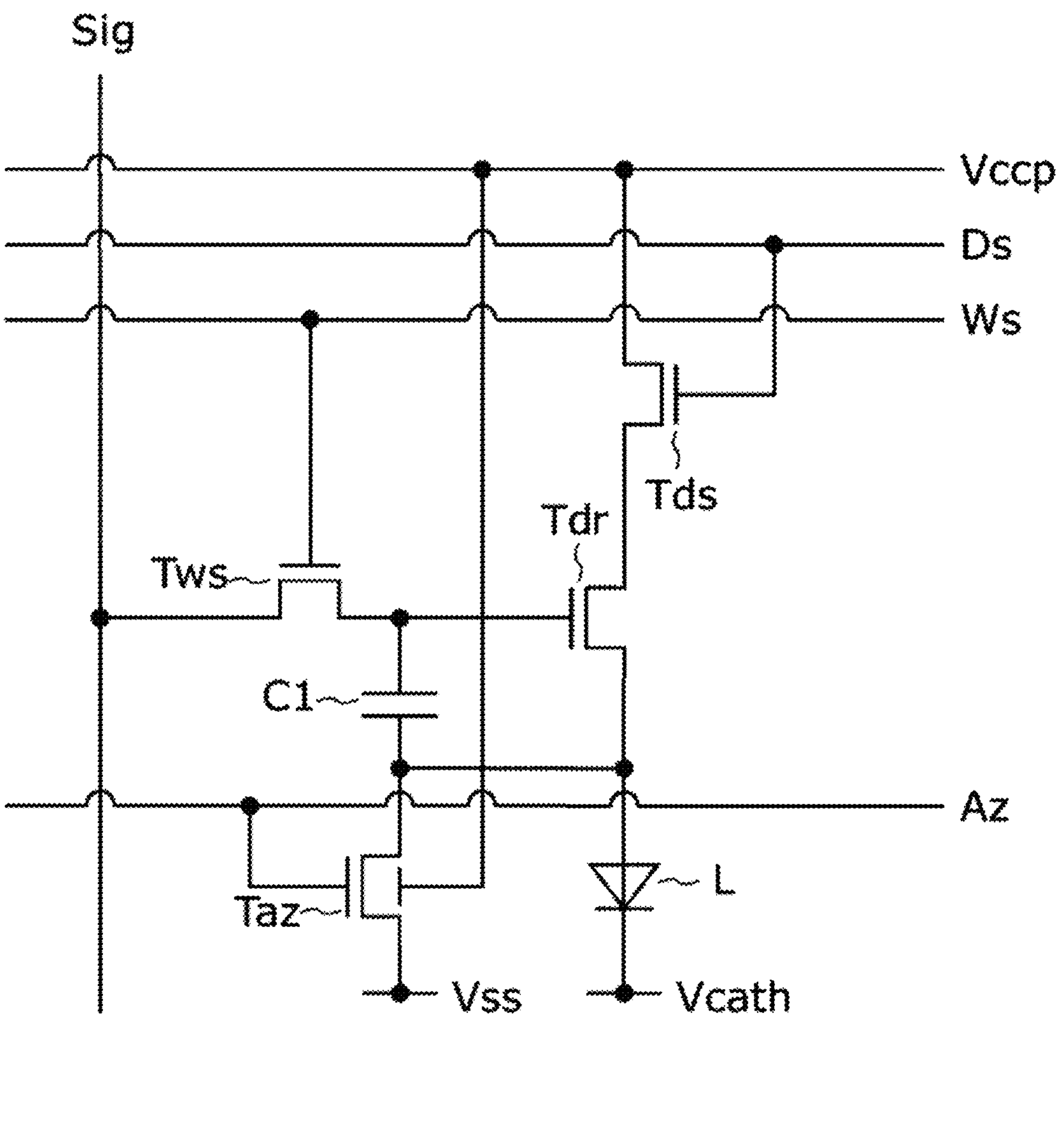
FIG. 7 is a diagram illustrating an example of a pixel according to an embodiment.

FIG. 7 is a diagram illustrating another example of a pixel 100. As a general simple example, the pixel 100 may include a transistor Taz, a transistor Tws, a transistor Tds, a transistor Tdr, and a capacitor C1.

The anode of the light emitting element L is connected to the source of the transistor Taz, the source of the transistor Tdr, and one terminal of the capacitor C1.

The transistor Taz is an n-type MOSFET, for example, and has a drain connected to the anode of the light emitting element L, a source connected to the voltage Vss, and a gate to which a reset voltage is applied from the signal line Az. The transistor Taz is an initialization transistor (reset transistor) that initializes the potential of the anode of the light emitting element L according to the reset voltage applied from the signal line Az. The voltage Vss is a reference voltage at the power supply voltage, for example, and may represent a grounded state or may be a potential of 0 V.

The capacitor C1 is a capacitor for controlling the potential on the anode side of the light emitting element L.

The transistor Tws is a n-type MOSFET, for example, and is a transistor that controls writing of a pixel value. In the transistor Tws, a data signal indicating a pixel value is input to a drain from the signal line Sig, a source is connected to the other end of the capacitor C1 and a gate of the transistor Tdr, and a signal for write control is applied to a gate from the signal line Ws. The transistor Tws causes a drain current according to a voltage applied from the signal line Sig on the basis of a signal from the signal line Ws to flow, and controls writing to the capacitor C1. When the transistor Tws is turned on, a voltage based on the magnitude of the data signal input from the signal line Sig is charged (written) in the capacitor C1, and the emission intensity of the light emitting element L is controlled by the charge amount of the capacitor C1.

The transistor Tds is an n-type MOSFET, for example, and is a transistor that causes a current based on a potential corresponding to a written pixel value to flow and controls driving of the light emitting element L. The transistor Tds has a drain connected to the power supply voltage Vccp for driving the MOSFET, a source connected to the drain of the transistor Tdr, and a gate to which a drive signal is applied from the signal line Ds. The transistor Tds causes a drain current to flow according to the drive signal applied from the signal line Ds, and increases the drain potential of the transistor Tdr.

The transistor Tdr is an n-type MOSFET, for example, and applies a current based on the data signal written by the transistor Tws to the light emitting element L, by driving the transistor Tdr. The transistor Tdr has a drain connected to the source of the transistor Tds, a source connected to the anode of the light emitting element L, and a gate connected to the source of the transistor Tws. In the transistor Tdr, the potential based on the data signal stored by the capacitor C1 is applied to the gate. Accordingly, the drain potential becomes a sufficiently large value, and thus, the drain current corresponding to the data signal flows. When the transistor Tdr causes the drain current to flow, the light emitting element L emits light with intensity (luminance) corresponding to the data signal input from the signal line Sig.

Similarly to the above, as a simple example, the pixel 100 emits light by performing writing by sampling the data signal input from the signal line Sig for determining the light emission intensity for each pixel in this manner, and causing the drain current corresponding to the intensity of the written signal to flow to the light emitting element L.

The transistor Taz is a transistor that performs a quick discharge operation at a timing after light emission to initialize a written state. The body of the transistor Taz needs to be held at a sufficiently large potential for appropriate driving while the pixel 100 operates (light emission, extinction), and the power supply voltage Vccp is applied, for example.

In the configuration of the pixel 100, at least one of the circuits that apply a voltage from the signal line Ws, the signal line Ds, or the signal line Sig may be configured to include signal transmission circuits provided in a staged manner at different distances from the pixel array 10 as described above. In this case, it is possible to limit the visibility of vertical streaks or horizontal streaks by connecting the columns by the connection method as described above.

Note that although the transistor Taz and the signal line Az are illustrated in FIG. 7, this is not an essential configuration. That is, the transistor Tds may be provided in the configuration of FIG. 6.

Figure 8:
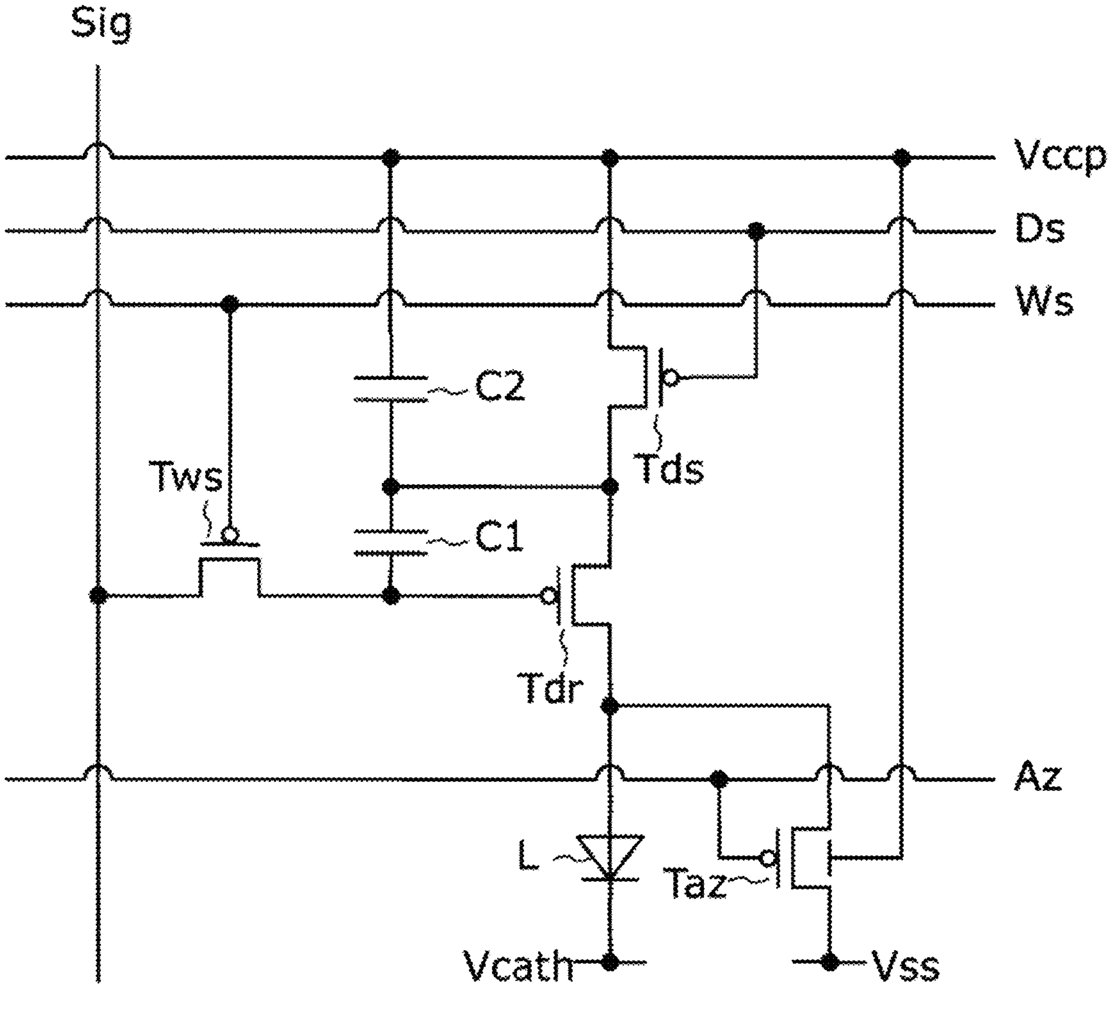
FIG. 8 is a diagram illustrating an example of a pixel according to an embodiment.

FIG. 8 is a diagram illustrating another example of a pixel 100. Although the configuration of the pixel 100 includes four transistors and one capacitor in FIG. 7, the pixel 100 includes four transistors and two capacitors in FIG. 8.

The capacitor C2 is a capacitor for sampling a data signal input from the signal line Sig on the basis of a write signal Ws together with the capacitor C1 and charging a voltage corresponding to the data signal. In this manner, even if the number of capacitors is changed, the potential of the anode of the light emitting element L is controlled by the transistor Taz to appropriately perform the extinction operation, and lighting is performed at an appropriate intensity by the transistors Tws, Tds, and Tdr.

In the configuration of the pixel 100, at least one of the circuits that apply a voltage of the signal line Ws, the signal line Ds, or the signal line Sig may be configured to include signal transmission circuits provided in a staged manner at different distances from the pixel array 10 as described above. In this case, it is possible to limit the visibility of vertical streaks or horizontal streaks by connecting the columns by the connection method as described above.

Figure 9:
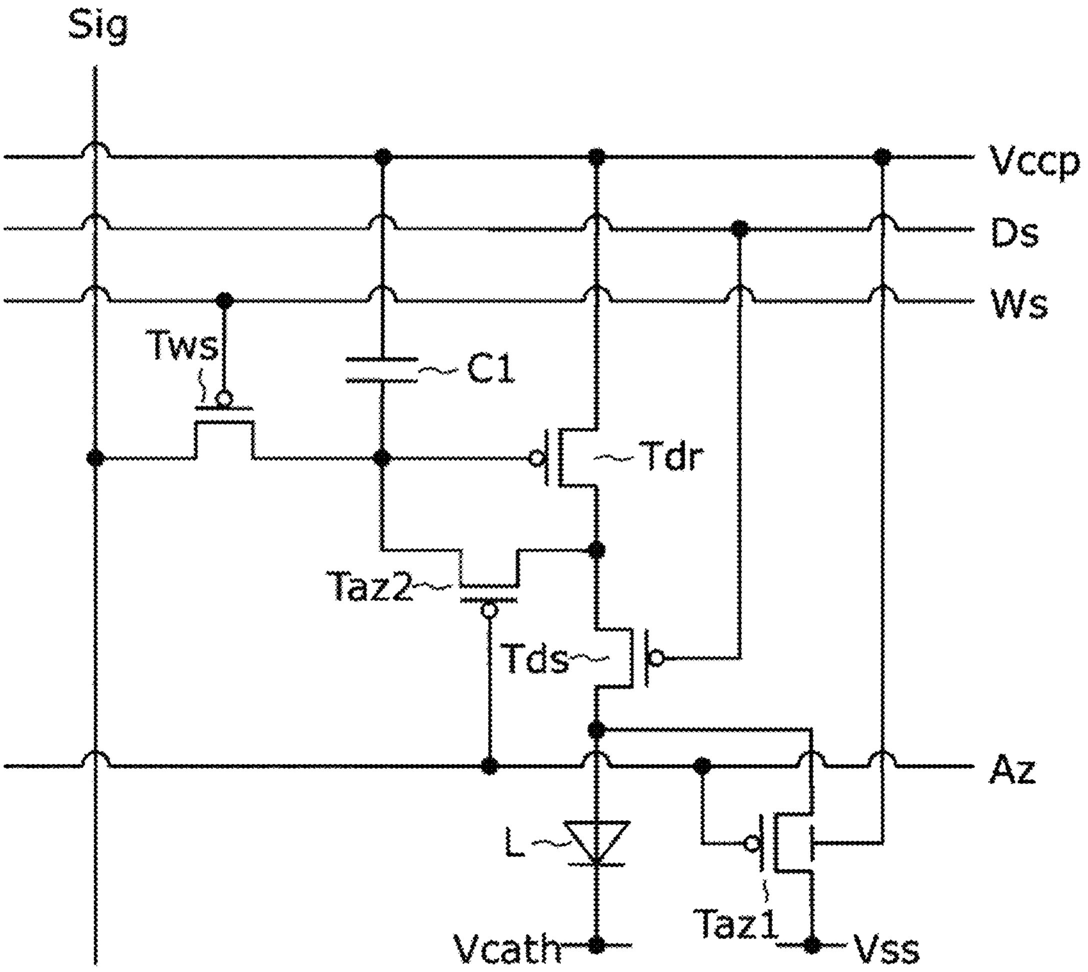
FIG. 9 is a diagram illustrating an example of a pixel according to an embodiment.

FIG. 9 is a diagram illustrating another example of a pixel 100. In FIG. 9, the pixel 100 includes transistors Taz1 and Taz2 as initialization transistors. As described above, by performing control in a similar manner in a case where a plurality of initialization transistors is present, it is possible to shorten the time during which a high potential is applied between the bodies and the gates of the initialization transistors.

In the configuration of the pixel 100, at least one of the circuits that apply a voltage from the signal line Ws, the signal line Ds, or the signal line Sig may be configured to include signal transmission circuits provided in a staged manner at different distances from the pixel array 10 as described above. In this case, it is possible to limit the visibility of streaks by connecting the columns by the connection method as described above.

Figure 10:
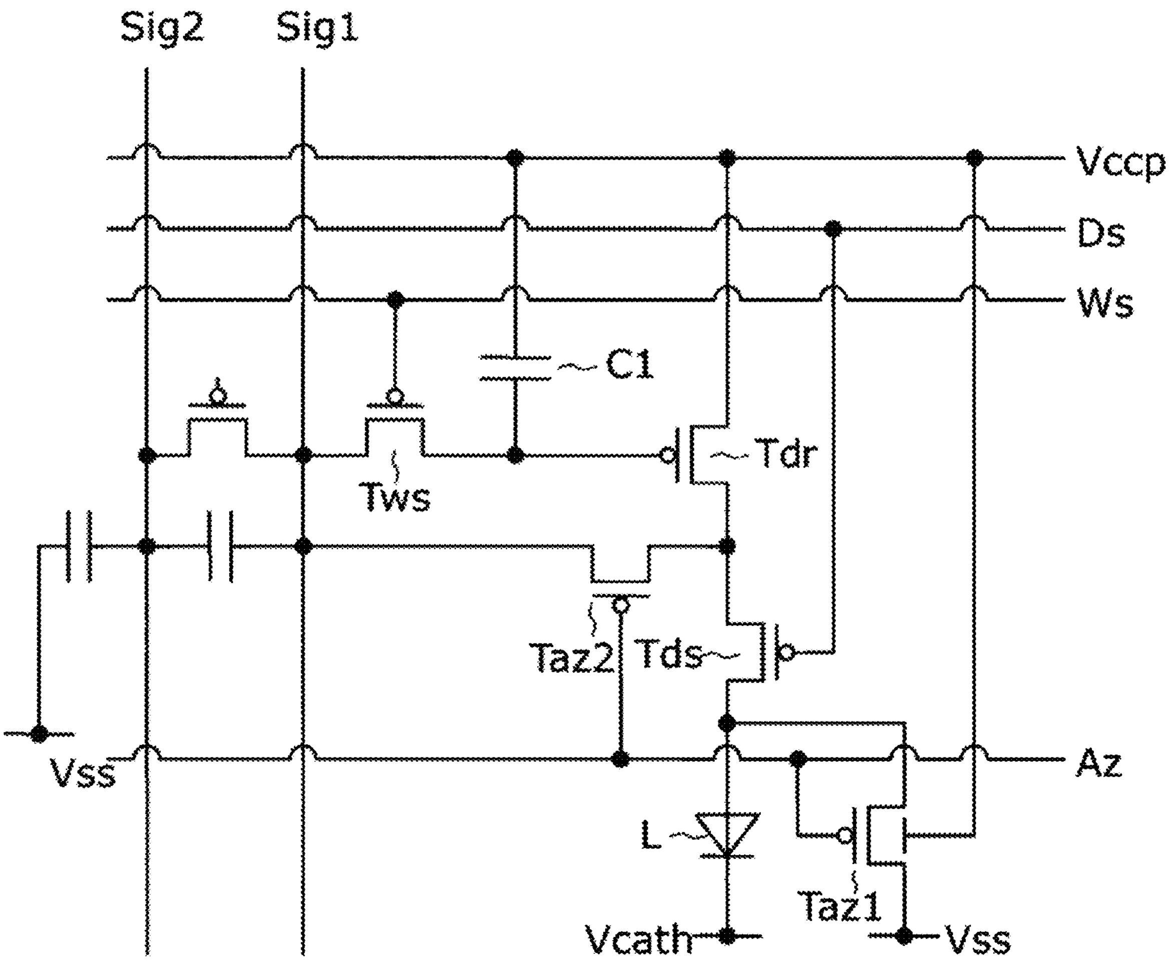
FIG. 10 is a diagram illustrating an example of a pixel according to an embodiment.

FIG. 10 is a diagram illustrating another example of a pixel 100. As illustrated in FIG. 10, even in a case where signals indicating the intensity of pixels are transmitted by two types of signal lines Sig1 and Sig2, similar arrangement and control can be performed.

In the configuration of the pixel 100, at least one of the circuits that apply a voltage of the signal line Ws, the signal line Ds, the signal line Sig1, or the signal line Sig2 may be configured to include signal transmission circuits provided in a staged manner at different distances from the pixel array 10 as described above. In this case, it is possible to limit the visibility of vertical streaks or horizontal streaks by connecting the columns by the connection method as described above.

Figure 11:
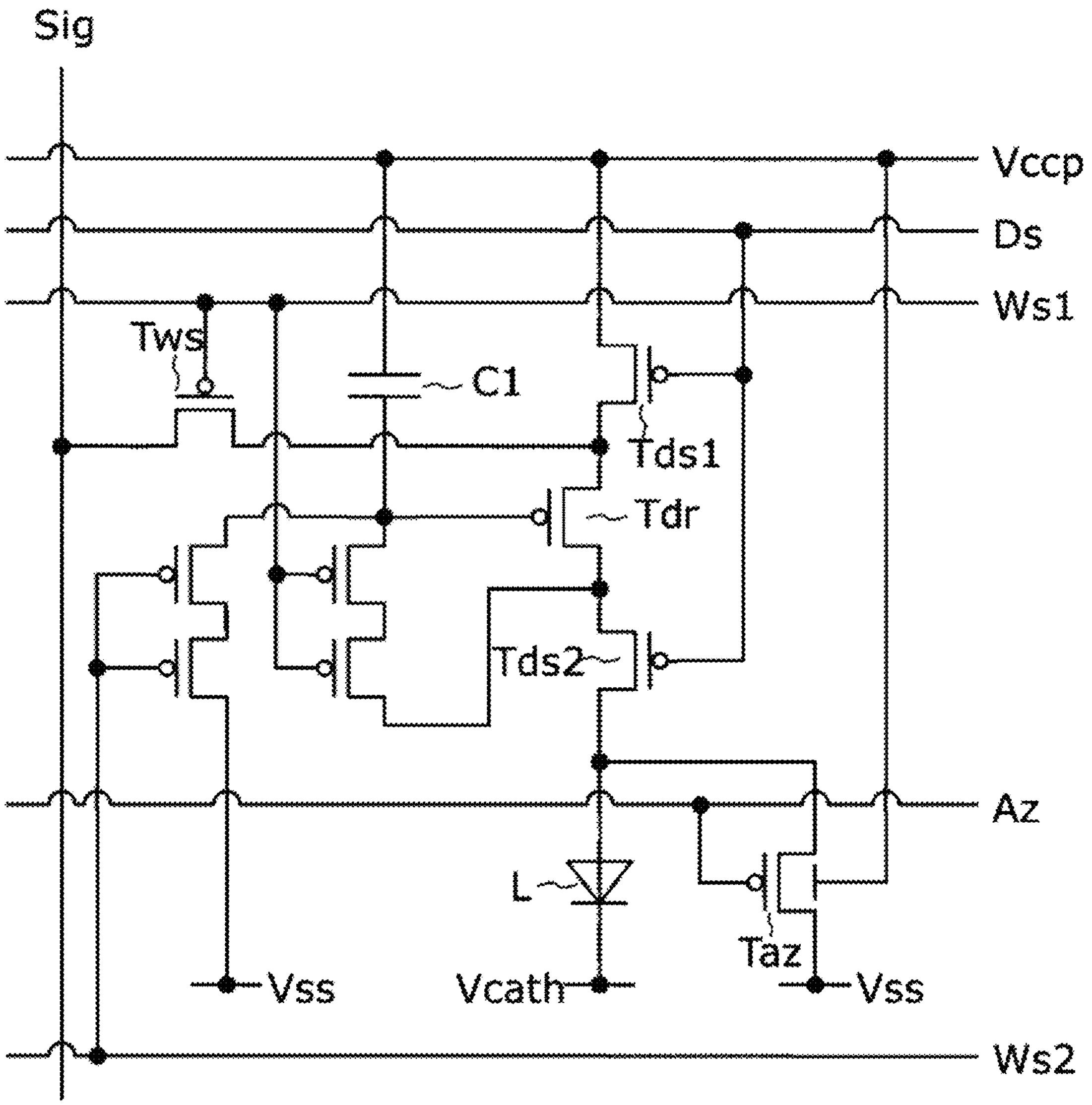
FIG. 11 is a diagram illustrating an example of a pixel according to an embodiment.

FIG. 11 is a diagram illustrating another example of a pixel 100. As illustrated in FIG. 11, two types of signal lines Ws1 and Ws2 may be used to control the sampling of the data signal. In this configuration, for example, the driving of the transistor Tdr is controlled on the basis of the control signal of the previous line. As described above, even in a case where the signal lines Ws1 and Ws2 are provided, similar arrangement and control can be performed.

That is, in the configuration of the pixel 100, at least one of the circuits that apply a voltage of the signal line Ws1, the signal line Ws2, the signal line Ds, or the signal line Az may be configured to include signal transmission circuits provided in a staged manner at different distances from the pixel array 10 as described above. In this case, it is possible to limit the visibility of vertical streaks or horizontal streaks by connecting the columns by the connection method as described above.

Figure 12:
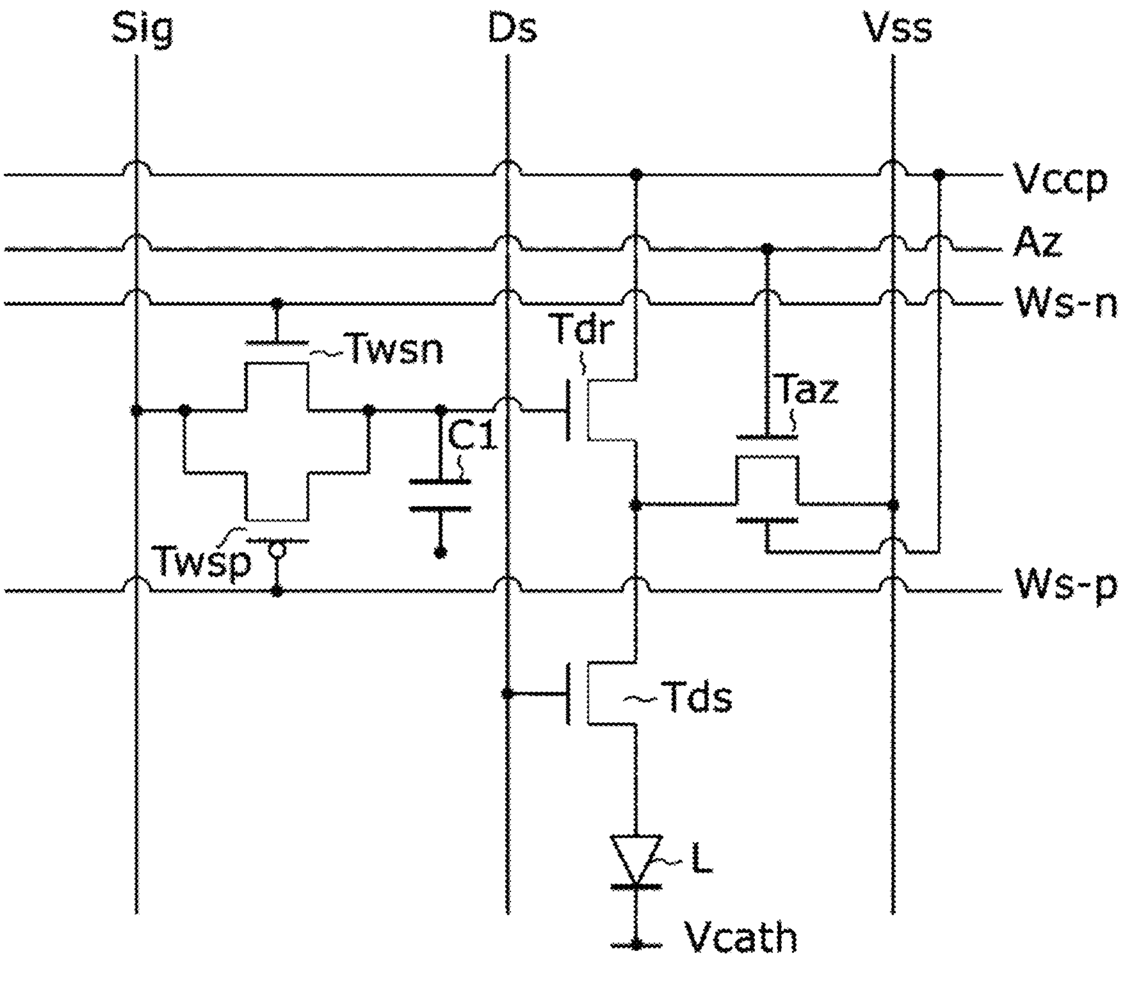
FIG. 12 is a diagram illustrating an example of a pixel according to an embodiment.

FIG. 12 is a diagram illustrating another example of a pixel 100. As illustrated in FIG. 12, the write transistor may be controlled by two transistors Twsn and Twsp that perform complementary driving. A write signal for driving an n-type MOSFET is applied from the signal line Ws-n to the gate of the transistor Twsn, and a write signal for driving a p-type MOSFET is applied from the signal line Ws-p to the gate of the transistor Twsp. As described above, even in a case where the signal lines Ws-n and Ws-p are provided, similar arrangement and control can be performed.

That is, in the configuration of the pixel 100, at least one of the circuits that apply a voltage of the signal line Ws-n, the signal line Ws-p, the signal line Ds, or the signal line Az may be configured to include signal transmission circuits provided in a staged manner at different distances from the pixel array 10 described above. In this case, it is possible to limit the visibility of vertical streaks or horizontal streaks by connecting the columns by the connection method as described above.

Although some examples of the pixel circuits have been described above, the configuration of the pixel 100 is not limited thereto, and the configuration of the signal transmission circuits provided in a staged manner in the present disclosure and the connection relationship between the signal transmission circuits and the pixels 100 can be similarly defined for other various pixel circuits.

Furthermore, in the examples of the pixel circuit described above, the polarities of the MOSFETs are defined as n-type and p-type, but these polarities can be freely selected as long as the pixel 100 appropriately emits light with intensity based on the data signal.

(Application Examples of Display Device 1 According to Present Disclosure)

First Application Example

Figure 13A:
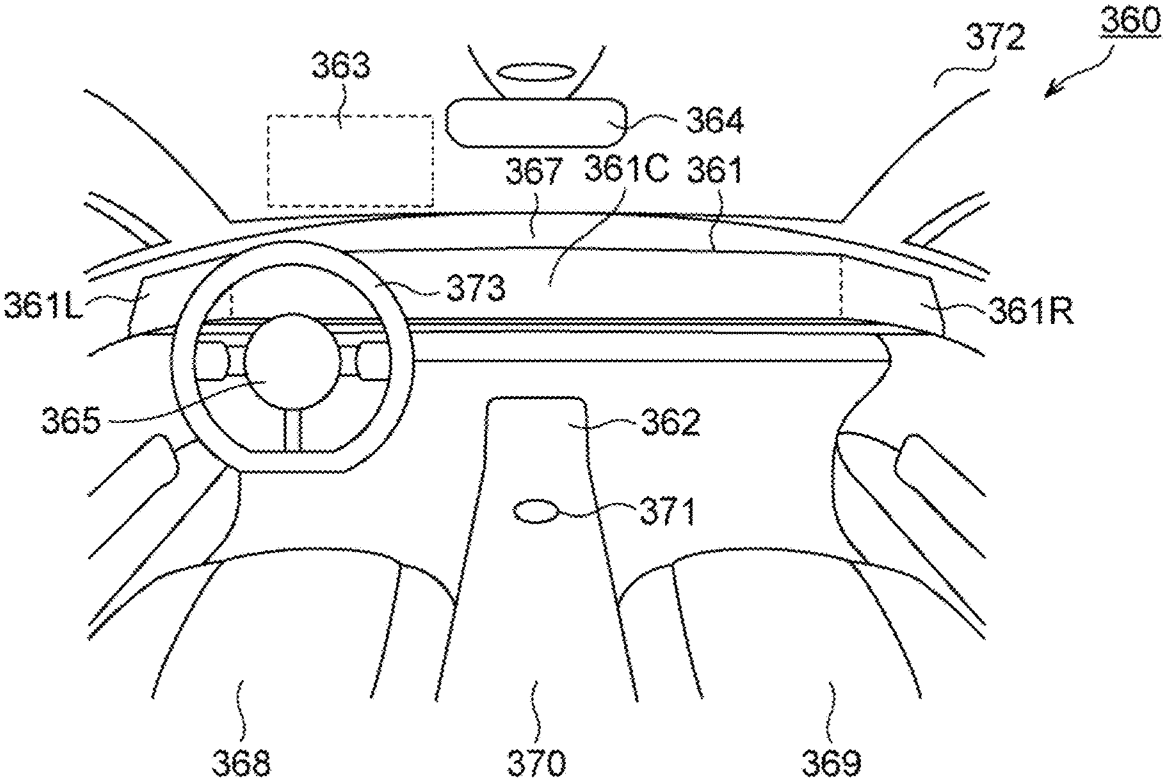
FIG. 13A is a diagram illustrating an internal state of a vehicle from a rear side to a front side of the vehicle.
Figure 13B:
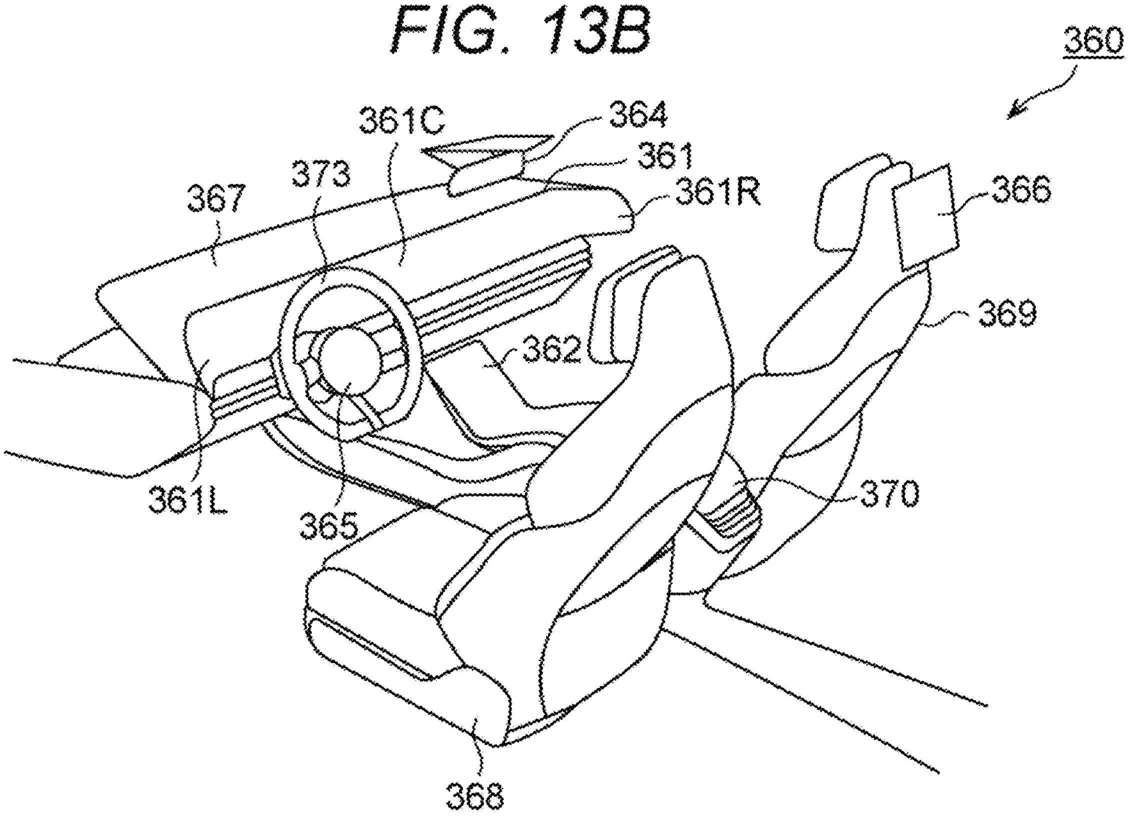
FIG. 13B is a diagram illustrating an internal state of the vehicle from an oblique rear side to an oblique front side of the vehicle.

The display device 1 according to the present disclosure can be used for various applications. FIGS. 13A and 13B are views illustrating an internal configuration of a vehicle 360 as a first application example of the display device 1 according to the present disclosure. FIG. 13A is a diagram illustrating an internal state of the vehicle 360 as viewed from a rear side to a front side of the vehicle 360, and FIG. 13B is a diagram illustrating an internal state of the vehicle 360 as viewed from an oblique rear side to an oblique front side of the vehicle 360.

The vehicle 360 in FIGS. 13A and 13B includes a center display 361, a console display 362, a head-up display 363, a digital rearview mirror 364, a steering wheel display 365, and a rear entertainment display 366.

The center display 361 is disposed on a dashboard 367 at a location facing a driver's seat 368 and a passenger seat 369. FIG. 13 illustrates an example of the center display 361 having a horizontally long shape extending from the driver seat 368 side to the passenger seat 369 side, but any screen size and arrangement location of the center display 361 may be adopted. The center display 361 can display information sensed by various sensors. As a specific example, the center display 361 can display an image captured by an image sensor, an image of the distance to an obstacle in front of or on a side of the vehicle, the distance being measured by a ToF sensor, a passenger's body temperature detected by an infrared sensor, and the like. The center display 361 can be used to display, for example, at least one piece of safety-related information, operation-related information, a lifelog, health-related information, authentication/identification-related information, or entertainment-related information.

The safety-related information is information of doze sensing, looking-away sensing, sensing of mischief of a child riding together, presence or absence of wearing of a seat belt, sensing of leaving of an occupant, and the like, and is information sensed by the sensor arranged to overlap with a back surface side of the center display 361, for example. The operation-related information senses a gesture related to an operation by an occupant, using a sensor. Gestures to be sensed may include an operation of various kinds of equipment in the vehicle 360. For example, operations of air conditioning equipment, a navigation device, an AV device, a lighting device, and the like are detected. The lifelogs include lifelogs of all the occupants. For example, the life log includes an action record of each occupant in the vehicle. By acquiring and storing the life log, it is possible to check a state of the occupant at a time of an accident. In the health-related information, the health condition of the occupant is estimated on the basis of the body temperature of the occupant detected by using a temperature sensor. Alternatively, the face of the occupant may be imaged by using an image sensor, and the health condition of the occupant may be estimated from the imaged facial expression. Furthermore, a conversation may be made with an occupant in automatic voice, and the health condition of the occupant may be estimated on the basis of the contents of a response from the occupant. The authentication/identification-related information includes a keyless entry function of performing face authentication using a sensor, and a function of automatically adjusting a seat height and position through face identification. The entertainment-related information includes a function of detecting, with a sensor, operation information about an AV device being used by an occupant, and a function of recognizing the face of the occupant with sensor and providing content suitable for the occupant through the AV device.

The console display 362 can be used to display lifelog information, for example. The console display 362 is disposed near a shift lever 371 of a center console 370 between the driver's seat 368 and the passenger seat 369. The console display 362 can also display information detected by various sensors. Furthermore, the console display 362 may display an image of the surroundings of the vehicle captured with an image sensor, or may display an image of the distance to an obstacle in the surroundings of the vehicle.

The head-up display 363 is virtually displayed behind a windshield 372 in front of the driver's seat 368. The head-up display 363 can be used to display at least one piece of the safety-related information, the operation-related information, the lifelog, the health-related information, the authentication/identification-related information, or the entertainment-related information, for example. Being virtually disposed in front of the driver's seat 368 in many cases, the head-up display 363 is suitable for displaying information directly related to operations of the vehicle 360, such as the speed, the remaining amount of fuel (battery), and the like of the vehicle 360.

The digital rearview mirror 364 can not only display the rear of the vehicle 360 but also display the state of an occupant in the rear seat, and thus, can be used to display the lifelog information by disposing a sensor on the back surface side of the digital rearview mirror 364 in an overlapping manner, for example.

The steering wheel display 365 is disposed near the center of a steering wheel 373 of the vehicle 360. The steering wheel display 365 can be used to display at least one piece of the safety-related information, the operation-related information, the lifelog, the health-related information, the authentication/identification-related information, or the entertainment-related information, for example. In particular, being located close to the driver's hands, the steering wheel display 365 is suitable for displaying the lifelog information such as the body temperature of the driver, or for displaying information regarding operations of the AV device, the air conditioning equipment, or the like.

The rear entertainment display 366 is attached to the back side of the driver's seat 368 or the passenger seat 369, and is an occupant in the rear seat to enjoy viewing/listening. The rear entertainment display 366 can be used to display at least one piece of the safety-related information, the operation-related information, the lifelog, the health-related information, the authentication/identification-related information, or the entertainment-related information, for example. In particular, as the rear entertainment display 366 is located in front of the occupant in the rear seat, information related to the occupant in the rear seat is displayed. For example, information regarding an operation of the AV device or the air conditioning equipment may be displayed, or a result of measurement of the body temperature or the like of an occupant in the rear seat with a temperature sensor may be displayed.

As described above, disposing a sensor on the back surface side of the display device 1 makes it possible to measure the distance to an object existing in the surroundings. Optical distance measurement methods are roughly classified into a passive type and an active type. By a method of the passive type, distance measurement is performed by receiving light from an object, without projecting light from a sensor to the object. Methods of the passive type include a lens focus method, a stereo method, and a monocular vision method. Methods of the active type include distance measurement that is performed by projecting light onto an object, and receiving reflected light from the object with a sensor to measure the distance. Methods of the active type include an optical radar method, an active stereo method, an illuminance difference stereo method, a moire topography method, and an interference method. The display device 1 according to the present disclosure can be used in distance measurement by any of these methods. With a sensor disposed on the back surface side of the display device 1 according to the present disclosure in an overlapping manner, distance measurement of the passive type or the active type described above can be performed.

Second Application Example

The display device 1 according to the present disclosure can be applied not only to various displays used in vehicles but also to displays mounted on various electronic apparatuses.

Figure 14A:
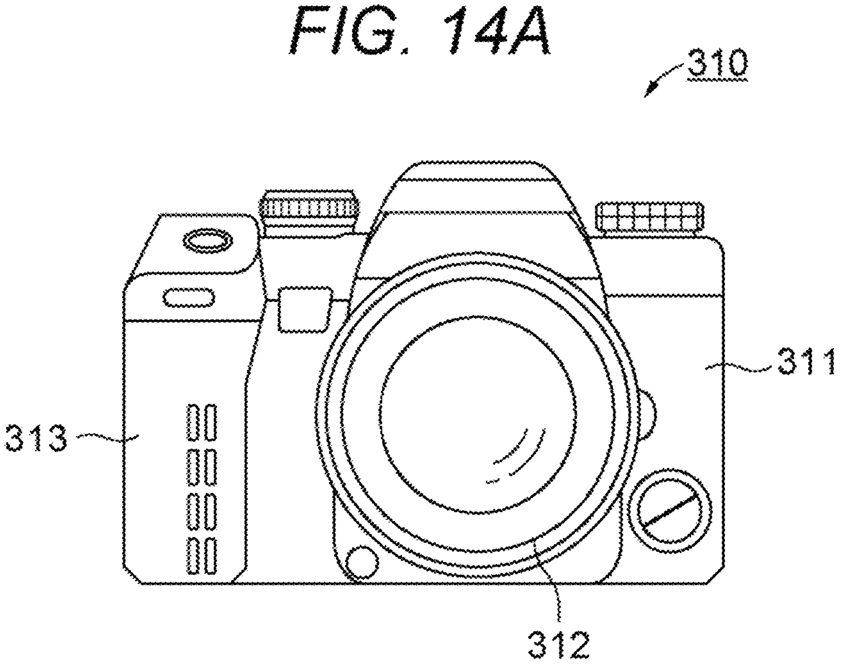
FIG. 14A is a front view of a digital camera as a second application example of the electronic apparatus.
Figure 14B:
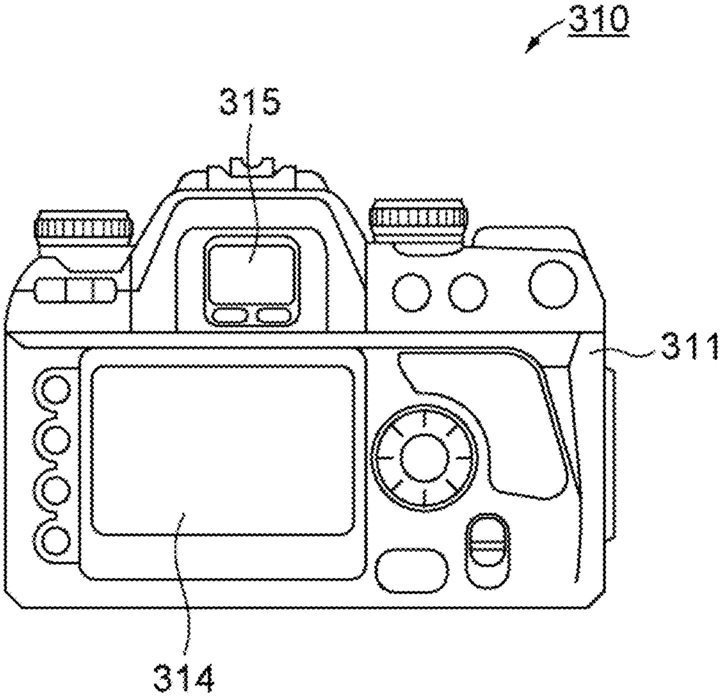
FIG. 14B is a rear view of the digital camera.

FIG. 14A is a front view of a digital camera 310 as a second application example of the display device 1. FIG. 14B is a rear view of the digital camera 310. The digital camera 310 of FIGS. 14A and 14B illustrates an example of a single-lens reflex camera in which a lens 121 is replaceable, but the display device 1 is also applicable to a camera in which the lens 121 is not replaceable.

In the camera in FIGS. 14A and 14B, when a person who captures an image looks into an electronic viewfinder 315 to determine a composition while holding a grip 313 of a camera body 311, and presses a shutter while adjusting focus, captured image data is stored in a memory in the camera. As illustrated in FIG. 14B, on a back side of the camera, a monitor screen 316 that displays the captured image data and the like and a live image and the like, and the electronic viewfinder 315 are provided. Furthermore, there is a case where a sub screen that displays setting information such as a shutter speed and an exposure value is provided on the upper surface of the camera.

By disposing a sensor, in an overlapping manner, on the back surface side of the monitor screen 316, the electronic viewfinder 315, the sub screen, and the like that are used for the camera, the camera can be used as the display device 1 according to the present disclosure.

Third Application Example

The display device 1 according to the present disclosure can also be applied to a head-mounted display (hereinafter referred to as an HMD). An HMD can be used for VR, AR, mixed reality (MR), substitutional reality (SR), or the like.

Figure 15A:
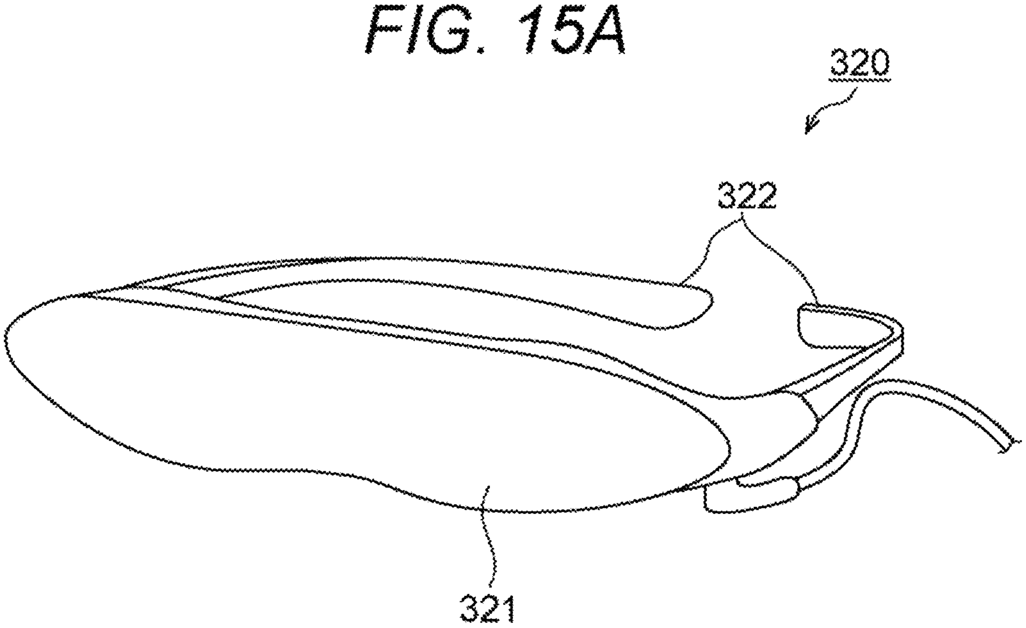
FIG. 15A is an external view of a head mounted display (HMD) as a third application example of the electronic apparatus.

FIG. 15A is an external view of an HMD 320 as a third application example of the display device 1. The HMD 320 in FIG. 15A includes an attachment member 322 for attachment to cover human eyes. The attachment members 322 are hooked and secured to human ears, for example. A display device 321 is provided inside the HMD 320, and the wearer of the HMD 320 can visually recognize a stereoscopic image and the like with the display device 321. The HMD 320 includes a wireless communication function and an acceleration sensor, for example, and can switch stereoscopic images or the like displayed on the display device 321 in accordance with a posture, a gesture, or the like of the wearer.

Furthermore, a camera may be disposed in the HMD 320 to capture an image around the wearer, and an image obtained by combining the image captured by the camera with an image generated by a computer may be displayed on the display device 321. For example, the camera is disposed to overlap with the back surface side of the display device 321 visually recognized by the wearer of the HMD 320, an image of the surroundings of the eyes of the wearer is captured with the camera, and the captured image is displayed on another display provided on the outer surface of the HMD 320, so that a person around the wearer can recognize the expression of the face and the movement of the eyes of the wearer in real time.

Figure 15B:
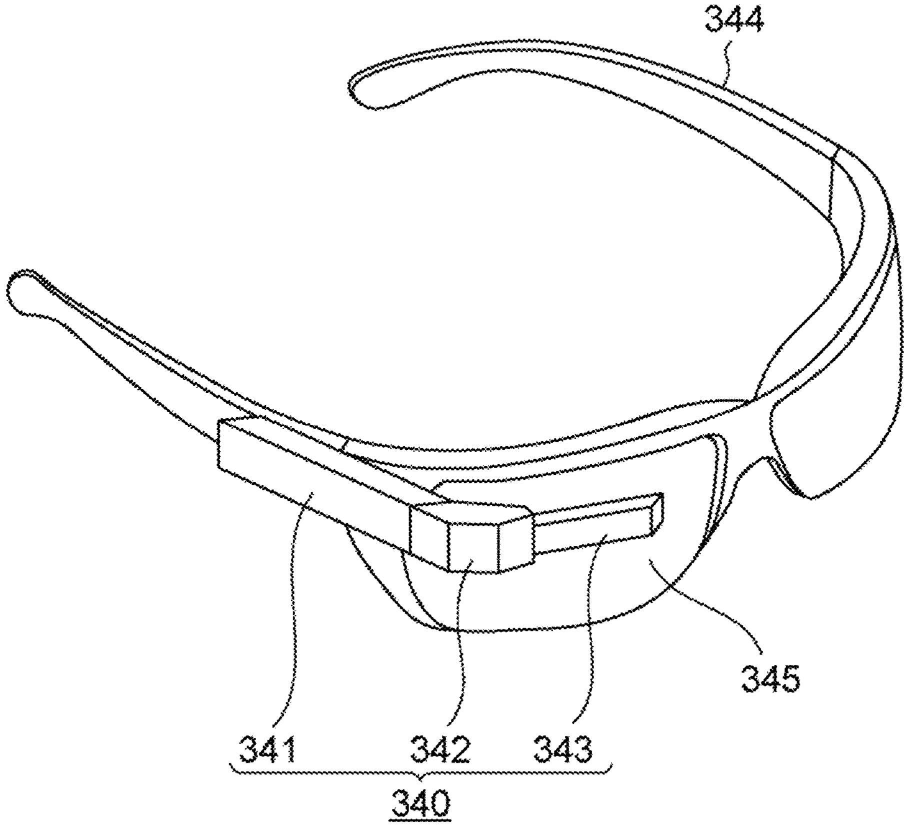
FIG. 15B is an external view of smart glasses.

Note that various kinds of HMD 320 are conceivable. For example, as illustrated in FIG. 15B, the display device 1 according to the present disclosure can also be applied to smart glasses 340 that display various kinds of information on glasses 344. The smart glasses 340 in FIG. 15B include a main body portion 341, an arm portion 342, and a lens barrel portion 343. The main body portion 341 is connected to the arm portion 342. The main body portion 341 is detachable from the glasses 344. The main body portion 341 includes a display unit and a control board for controlling operations of the smart glasses 340. The main body portion 341 and the lens barrel are connected to each other via the arm portion 342. The lens barrel portion 343 emits image light emitted from the main body portion 341 through the arm portion 342, to the side of lenses 345 of the glasses 344. This image light enters the human eyes through the lenses 345. The wearer of the smart glasses 340 in FIG. 15B can visually recognize not only a surrounding situation but also various pieces of information emitted from the lens barrel portion 343, as with conventional glasses.

Fourth Application Example

The display device 1 according to the present disclosure can also be applied to a television device (hereinafter referred to as a TV). In recent TVs, a frame tends to be as small as possible from the viewpoint of downsizing and design property. Therefore, in a case where a camera to capture an image of a viewer is provided on a TV, it is desirable to arrange the camera so as to overlap with the back surface side of a display panel 331 of the TV.

Figure 16:
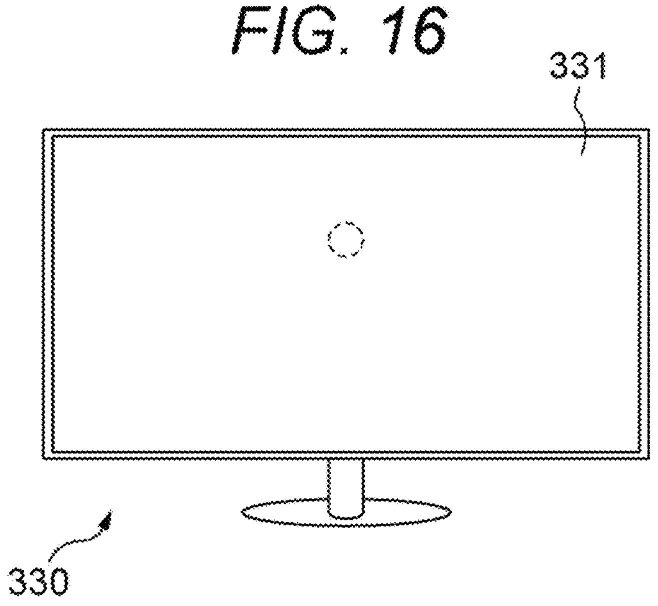
FIG. 16 is an external view of a television (TV) as a fourth application example of the electronic apparatus.

FIG. 16 is an external view of a TV 330 as a fourth application example of the display device 1. In the TV 330 in FIG. 16, the frame is minimized, and almost the entire region on the front side is a display area. The TV 330 incorporates a sensor such as a camera to capture the image of the viewer. The sensor in FIG. 16 is arranged on the back side of a part (for example, a broken line part) in the display panel 331. The sensor may be an image sensor module, or various sensors can be applied such as a sensor for face authentication, a sensor for distance measurement, and a temperature sensor, and a plurality of types of sensors may be arranged on the back surface side of the display panel 331 of the TV 330.

As described above, with the display device 1 of the present disclosure, an image sensor module can be disposed to overlap with the back surface side of the display panel 331. Accordingly, there is no need to dispose a camera or the like on the frame, the TV 330 can be downsized, and there is no possibility that the design is impaired by the frame.

Fifth Application Example

Figure 17:
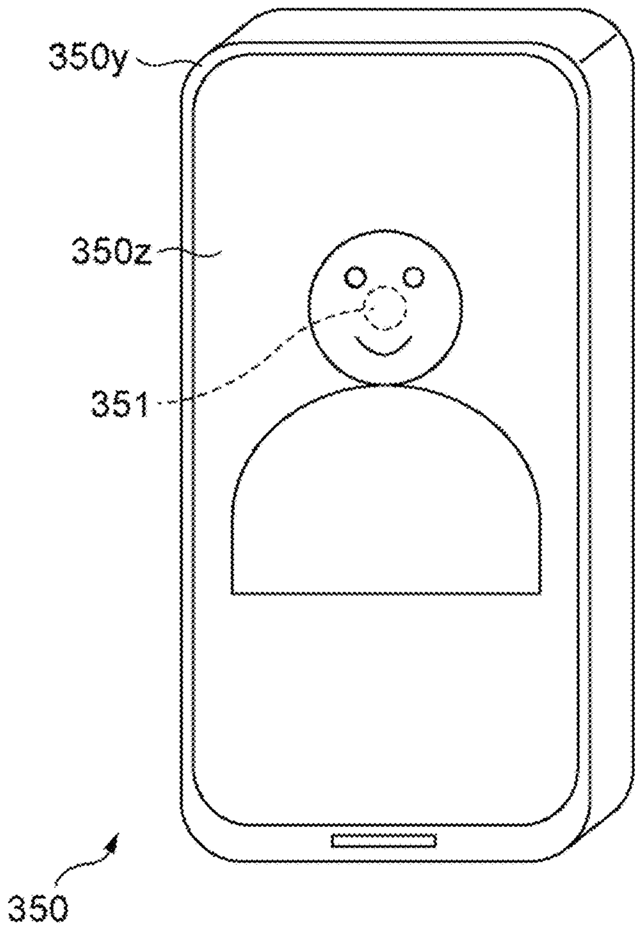
FIG. 17 is an external view of a smartphone as a fifth application example of the electronic apparatus.

The display device 1 according to the present disclosure can also be applied to a smartphone and a mobile phone. FIG. 17 is an external view of a smartphone 350 as a fifth application example of the display device 1. In an example in FIG. 17, a display surface 350*z* covers nearly the outer shape size of the display device 1, and the width of a bezel 350*y* around the display surface 350*z* is set to several millimeters or smaller. In general, a front camera is often mounted on the bezel 350*y*, but in FIG. 17, as indicated by a broken line, the image sensor module 351 serving as the front camera is arranged on, for example, the back surface side of a substantially central portion of the display surface 2*z*. As described above, by providing the front camera on the back surface side of the display surface 2*z* in this manner, the front camera is no longer necessary to be arranged on the bezel 350*y*, and thus the width of the bezel 350*y* can be narrowed.

Some examples above illustrate non-limiting examples of the pixel 100, and the pixel 100 may have other configurations.

The embodiments described above may have the following modes.

(1)

A display device including:

a pixel array in which a plurality of pixels each having a light emitting element is arranged in a two-dimensional array along a first direction and a second direction that is a direction intersecting the first direction;

a plurality of signal lines extending in the first direction; and a driver in which a plurality of signal transmission units configured to supply signals to the plurality of signal lines is arranged, in which n pieces (n is any integer satisfying n>2) of the plurality of signal transmission units are arranged in a staged manner along the first direction, a first signal transmission unit arranged at an m-th stage (m is any integer satisfying 1<=m<n) among the plurality of signal transmission units is provided to be electrically connectable to a first signal line among the plurality of signal lines, and a second signal line adjacent to the first signal line among the plurality of signal lines is electrically connected to, among the plurality of signal transmission units, the first signal transmission unit or a second signal transmission unit arranged at an (m−1)th stage (m−1>=1) or an (m+1)th stage (m+1<=n).

(2)

A display device including:

a pixel array in which a plurality of pixels each having a light emitting element is arranged in a two-dimensional array along a first direction and a second direction that is a direction intersecting the first direction;

a plurality of signal lines extending in the first direction; and a driver in which a plurality of signal transmission units configured to supply signals to the plurality of signal lines is arranged, in which n pieces (n is any integer satisfying n>2) of the plurality of signal transmission units are arranged in a staged manner along the first direction, a first signal transmission unit arranged at a first stage among the plurality of signal transmission units is provided to be electrically connectable to a first signal line among the plurality of signal lines, and a second signal line adjacent to the first signal line among the plurality of signal lines is electrically connected to, among the plurality of signal transmission units, the first signal transmission unit or a second signal transmission unit arranged at an m-th stage (m is any integer satisfying 1<m<n).

(3)

The display device according to (1) or (2), in which the signal lines are configured to propagate signals for driving the light emitting elements.

(4)

The display device according to (3), in which the pixel includes:

a capacitor;

a write transistor configured to sample a data voltage supplied to a data line as the signal line and supply the data voltage to the capacitor; and a drive transistor configured to supply a current corresponding to a voltage accumulated in the capacitor to the light emitting element.

(5)

The display device according to (3), in which the pixel includes:

a capacitor;

a write transistor configured to sample a data voltage supplied to a data line according to a control signal supplied to a first control line as the signal line and supply the data voltage to the capacitor; and a drive transistor configured to supply a current corresponding to a voltage accumulated in the capacitor to the light emitting element.

(6)

The display device according to (3), in which the pixel includes:

a capacitor;

a write transistor configured to sample a data voltage supplied to a data line and supply the data voltage to the capacitor;

a drive transistor configured to supply a current corresponding to a voltage accumulated in the capacitor to the light emitting element; and a first reset transistor configured to supply a predetermined voltage to an anode of the light emitting element according to a control signal supplied to a second control line as the signal line.

(7)

The display device according to (3), in which the pixel includes:

a capacitor;

a write transistor configured to sample a data voltage supplied to a data line and supply the data voltage to the capacitor;

a drive transistor configured to supply a current corresponding to a voltage accumulated in the capacitor to the light emitting element; and a light emission control transistor that is connected in series with the light emitting element and the drive transistor, and is configured to be turned on and off according to a control signal supplied to a third control line as the signal line.

(8)

The display device according to (3), in which the pixel includes:

a capacitor;

a write transistor configured to sample a data voltage supplied to a data line and supply the data voltage to the capacitor;

a drive transistor configured to supply a current corresponding to a voltage accumulated in the capacitor to the light emitting element; and a second reset transistor that is connected between a gate and a drain of the drive transistor, and is configured to be turned on and off according to a control signal supplied to a fourth control line as the signal line.

(9)

The display device according to any one of (3) to (8), in which the plurality of signal lines is electrically connected directly to one of the plurality of signal transmission units.

(10)

The display device according to any one of (3) to (8), in which the driver includes a selector, and the plurality of signal lines is provided to be electrically connectable to the plurality of signal transmission units via the selector.

(11)

The display device according to any one of (1) to (10), in which the plurality of signal transmission units includes a first stage, a second stage, . . . , an m-th stage, and an n-th stage in descending order of distance from the pixel array.

(12)

The display device according to any one of (1) to (11), in which a resistance difference between a connection between the first signal transmission unit and the pixel array and a connection between an n-th signal transmission unit and the pixel array is larger than a resistance difference in a combination of connections between another of the plurality of signal transmission units and the pixel array.

(13)

The display device according to any one of (1) to (12), in which a parasitic capacitance difference between a connection between the first signal transmission unit and the pixel array and a connection between an n-th signal transmission unit and the pixel array is larger than a parasitic capacitance difference in a combination of connections between another of the plurality of signal transmission units and the pixel array.

(14)

The display device according to (2), in which the plurality of signal transmission units includes a first stage, a second stage, . . . , an m-th stage, and an n-th stage in descending order of distance from the pixel array.

(15)

The display device according to (2), in which a resistance difference between a connection between the first signal transmission unit and the pixel array and a connection between an n-th signal transmission unit and the pixel array is larger than a resistance difference in a combination of connections between another of the plurality of signal transmission units and the pixel array.

(16)

The display device according to (2), in which a parasitic capacitance difference between a connection between the first signal transmission unit and the pixel array and a connection between an n-th signal transmission unit and the pixel array is larger than a parasitic capacitance difference in a combination of connections between another of the plurality of signal transmission units and the pixel array.

Aspects of the present disclosure are not limited to the above-described embodiments, and include various conceivable modifications. The effects of the present disclosure are not limited to the above-described contents. The components in each of the embodiments may be appropriately combined and applied. That is, various additions, modifications, and partial deletions can be made without departing from the conceptual idea and gist of the present disclosure derived from the contents defined in the claims and equivalents and the like thereof.

REFERENCE SIGNS LIST

1 Display device
10 Pixel array
100 Pixel
102 Light emitting element
104 Pixel circuit
12 Vertical drive circuit
120 First signal line
14 Horizontal drive circuit
140 Second signal line

The invention claimed is:

1. A display device comprising:

a pixel array including a plurality of pixels arranged in a two-dimensional array along a first direction and a second direction that is a direction intersecting the first direction, each of the pixels respectively including a light emitting element;

a plurality of signal lines extending in the first direction, the plurality of signal lines including a first signal line and a second signal line; and a driver in which a plurality of signal transmission circuits configured to supply signals to the plurality of signal lines is arranged, the plurality of signal transmission circuits including a first signal transmission circuit and a second signal transmission circuit, wherein n pieces (n is any integer satisfying n>2) of the plurality of signal transmission circuits are arranged in a staged manner along the first direction, the first signal transmission circuit is arranged at an m-th stage (m is any integer satisfying 1<=m<n) and is configured to be electrically connectable to the first signal line, the second signal line is adjacent to the first signal line and is electrically connected to the first signal transmission circuit, or the second signal transmission circuit, the second signal transmission circuit being arranged at an (m−1)th stage (m−1>=1) or an (m+1)th stage (m+1<=n), and a resistance difference between a connection between the first signal transmission circuit and the pixel array and a connection between an n-th signal transmission circuit and the pixel array is larger than a resistance difference in a combination of connections between any two of the plurality of signal transmission circuits other than the first signal transmission circuit and the pixel array.

2. The display device according to claim 1, wherein the signal lines are configured to propagate signals for driving the light emitting elements.

3. The display device according to claim 2, wherein each of the pixels respectively includes:

a capacitor;

a write transistor configured to sample a data voltage supplied to a data line as a respective signal line of the plurality of signal lines, and to supply the data voltage to the capacitor; and a drive transistor configured to supply a current corresponding to a voltage accumulated in the capacitor to the light emitting element.

4. The display device according to claim 2, wherein each of the pixels respectively includes:

a capacitor;

a write transistor configured to sample a data voltage supplied to a data line according to a control signal supplied to a first control line as a respective signal line of the plurality of signal lines, and to supply the data voltage to the capacitor; and a drive transistor configured to supply a current corresponding to a voltage accumulated in the capacitor to the light emitting element.

5. The display device according to claim 2, wherein each of the pixels respectively includes:

a capacitor;

a write transistor configured to sample a data voltage supplied to a data line and supply the data voltage to the capacitor;

a drive transistor configured to supply a current corresponding to a voltage accumulated in the capacitor to the light emitting element; and a first reset transistor configured to supply a predetermined voltage to an anode of the light emitting element according to a control signal supplied to a second control line as the signal line.

6. The display device according to claim 2, wherein each of the pixels respectively includes:

a capacitor;

a write transistor configured to sample a data voltage supplied to a data line and supply the data voltage to the capacitor;

a drive transistor configured to supply a current corresponding to a voltage accumulated in the capacitor to the light emitting element; and a light emission control transistor that is connected in series with the light emitting element and the drive transistor, and is configured to be turned on and off according to a control signal supplied to a third control line as the signal line.

7. The display device according to claim 2, wherein each of the pixels respectively includes:

a capacitor;

a write transistor configured to sample a data voltage supplied to a data line and supply the data voltage to the capacitor;

a drive transistor configured to supply a current corresponding to a voltage accumulated in the capacitor to the light emitting element; and a second reset transistor that is connected between a gate and a drain of the drive transistor, and is configured to be turned on and off according to a control signal supplied to a fourth control line as the signal line.

8. The display device according to claim 2, wherein the plurality of signal lines is electrically connected directly to one of the plurality of signal transmission circuits.

9. The display device according to claim 2, wherein the driver includes a selector, and the plurality of signal lines is provided to be electrically connectable to the plurality of signal transmission circuits via the selector.

10. The display device according to claim 1, wherein the plurality of signal transmission circuits includes a first stage, a second stage, an m-th stage, and an n-th stage in descending order of distance from the pixel array.

11. A display device comprising:

a pixel array including a plurality of pixels arranged in a two-dimensional array along a first direction and a second direction that is a direction intersecting the first direction, each of the pixels respectively including a light emitting element;

a plurality of signal lines extending in the first direction, the plurality of signal lines including a first signal line and a second signal line; and a driver in which a plurality of signal transmission circuits configured to supply signals to the plurality of signal lines is arranged, the plurality of signal transmission circuits including a first signal transmission circuit and a second signal transmission circuit, wherein n pieces (n is any integer satisfying $n>2$) of the plurality of signal transmission circuits are arranged in a staged manner along the first direction, the first signal transmission circuit is arranged at a first stage and is configured to be electrically connectable to the first signal line, the second signal line is adjacent to the first signal line and is electrically connected to the first signal transmission circuit or the second signal transmission circuit, the second signal transmission circuit being arranged at an m-th stage (m is any integer satisfying $1<m<n$), and a resistance difference between a connection between the first signal transmission circuit and the pixel array and a connection between an n-th signal transmission circuit and the pixel array is larger than a resistance difference in a combination of connections between any two of the plurality of signal transmission circuits other than the first signal transmission circuit and the pixel array.

12. The display device according to claim 11, wherein the plurality of signal transmission circuits includes a first stage, a second stage, an m-th stage, and an n-th stage in descending order of distance from the pixel array.

13. A display device comprising:

a pixel array including a plurality of pixels arranged in a two-dimensional array along a first direction and a second direction that is a direction intersecting the first direction, each of the pixels respectively including a light emitting element;

a plurality of signal lines extending in the first direction, the plurality of signal lines including a first signal line and a second signal line; and a driver in which a plurality of signal transmission circuits configured to supply signals to the plurality of signal lines is arranged, the plurality of signal transmission circuits including a first signal transmission circuit and a second signal transmission circuit, wherein n pieces (n is any integer satisfying $n>2$) of the plurality of signal transmission circuits are arranged in a staged manner along the first direction, the first signal transmission circuit is arranged at an m-th stage (m is any integer satisfying $1\leq m<n$) and is configured to be electrically connectable to the first signal line, the second signal line is adjacent to the first signal line and is electrically connected to the first signal transmission circuit or the second signal transmission circuit, the second signal transmission circuit being arranged at an (m−1)th stage (m−1≥1) or an (m+1)th stage (m+1≤n), and a parasitic capacitance difference between a connection between the first signal transmission circuit and the pixel array and a connection between an n-th signal transmission circuit and the pixel array is larger than a parasitic capacitance difference in a combination of connections between any two of the plurality of signal transmission circuits other than the first signal transmission circuit and the pixel array.

14. A display device comprising:

a pixel array including a plurality of pixels arranged in a two-dimensional array along a first direction and a second direction that is a direction intersecting the first direction, each of the pixels respectively including a light emitting element;

a plurality of signal lines extending in the first direction, the plurality of signal lines including a first signal line and a second signal line; and a driver in which a plurality of signal transmission circuits configured to supply signals to the plurality of signal lines is arranged, the plurality of signal transmission circuits including a first signal transmission circuit and a second signal transmission circuit, wherein n pieces (n is any integer satisfying n>2) of the plurality of signal transmission circuits are arranged in a staged manner along the first direction, the first signal transmission circuit is arranged at a first stage and is configured to be electrically connectable to the first signal line, the second signal line is adjacent to the first signal line and is electrically connected to the first signal transmission circuit or the second signal transmission circuit, the second signal transmission circuit being arranged at an m-th stage (m is any integer satisfying 1<m<n), and a parasitic capacitance difference between a connection between the first signal transmission circuit and the pixel array and a connection between an n-th signal transmission circuit and the pixel array is larger than a parasitic capacitance difference in a combination of connections between any two of the plurality of signal transmission circuits other than the first signal transmission circuit and the pixel array.

15. The display device according to claim 1, wherein the pixel array comprises a first region with pixels arranged along the first direction, and a second region with pixels arranged along the first direction, the second region being adjacent to the first region along the second direction.

16. The display device according to claim 15, wherein the plurality of signal lines comprise a plurality of first signal lines extending in the first direction in the first region, and a plurality of second signal lines extending in the first direction in the second region.

17. The display device according to claim 16, wherein the plurality of first signal lines are connected, from a first side to a second side in the second direction, in order from the first signal transmission circuit to the n-th signal transmission circuit.

18. The display device according to claim 16, wherein the plurality of second signal lines are connected, from a first side to a second side in the second direction, in order from the n-th signal transmission circuit to the first signal transmission circuit.

* * * * *